United States Patent
Colgrove et al.

(10) Patent No.: US 11,185,801 B2
(45) Date of Patent: Nov. 30, 2021

(54) APPARATUSES, METHODS, AND SYSTEMS FOR VIBRATORY SCREENING

(71) Applicant: Derrick Corporation, Buffalo, NY (US)

(72) Inventors: James R. Colgrove, East Aurora, NY (US); Michael L. Peresan, Strykersville, NY (US)

(73) Assignee: DERRICK CORPORATION, Buffalo, NY (US)

( * ) Notice: Subject to any disclaimer, the term of this patent is extended or adjusted under 35 U.S.C. 154(b) by 173 days.

(21) Appl. No.: 16/460,764

(22) Filed: Jul. 2, 2019

(65) Prior Publication Data
US 2019/0366243 A1  Dec. 5, 2019

Related U.S. Application Data

(63) Continuation-in-part of application No. 15/785,141, filed on Oct. 16, 2017, now Pat. No. 10,399,124, and
(Continued)

(51) Int. Cl.
*B07B 13/16* (2006.01)
*B07B 1/46* (2006.01)
(Continued)

(52) U.S. Cl.
CPC ......... *B01D 33/0376* (2013.01); *B01D 33/37* (2013.01); *B07B 1/46* (2013.01); *B07B 13/16* (2013.01); *B07B 2201/04* (2013.01)

(58) Field of Classification Search
CPC ...... B01D 33/0376; B01D 33/37; B07B 1/46; B07B 13/16; B07B 2201/04
(Continued)

(56) References Cited

U.S. PATENT DOCUMENTS

| | | |
|---|---|---|
| X790572 | 5/1905 | Hickman |
| X821874 | 5/1906 | Kirksey |

(Continued)

FOREIGN PATENT DOCUMENTS

| | | |
|---|---|---|
| CL | 2015002647 A1 | 4/2016 |
| CL | 2018000975 A | 7/2018 |

(Continued)

*Primary Examiner* — Terrell H Matthews
(74) *Attorney, Agent, or Firm* — Jason P. Mueller; FisherBroyles, LLP

(57) ABSTRACT

Vibratory screening machines that include stacked screening deck assemblies are provided. In some embodiments, at least one of the vibratory screening machines may include an outer frame, an inner frame connected to the outer frame, and a vibratory motor assembly secured to the inner frame for vibrating the inner frame. A plurality of screen deck assemblies may be attached to the inner frame in a stacked arrangement, each configured to receive replaceable screen assemblies. The screen assemblies may be secured to respective ones of the plurality of the screen deck assemblies by tensioning the screen assemblies in a direction that a material to be screened flows across the screen assemblies. An undersized material discharge assembly may be configured to receive materials that pass through the screen assemblies, and an oversized material discharge assembly having a deflector may be configured to receive materials that pass over the screen assemblies.

30 Claims, 26 Drawing Sheets

Related U.S. Application Data a continuation-in-part of application No. 29/644,138, filed on Apr. 15, 2018, now Pat. No. Des. 854,066, and a continuation-in-part of application No. 29/679,608, filed on Feb. 7, 2019, now Pat. No. Des. 890,236.

(60) Provisional application No. 62/408,514, filed on Oct. 14, 2016, provisional application No. 62/488,293, filed on Apr. 21, 2017.

(51) Int. Cl.
 *B01D 33/03* (2006.01)
 *B01D 33/37* (2006.01)

(58) Field of Classification Search
 USPC ........................................................ 209/311
 See application file for complete search history.

(56) References Cited

U.S. PATENT DOCUMENTS

| | | | |
|---|---|---|---|
| 2,576,794 A | 11/1951 | Jost et al. | |
| 2,784,842 A | 3/1957 | Cover | |
| 3,232,431 A | 2/1966 | Musschoot et al. | |
| 3,241,671 A | 3/1966 | Brauchla | |
| 3,439,800 A | 4/1969 | Tonjes | |
| 3,642,133 A | 2/1972 | Venanzetti | |
| 3,680,697 A | 8/1972 | Hubach | |
| 3,688,902 A | 9/1972 | Hubach | |
| 4,065,382 A | 12/1977 | Derrick, Jr. | |
| 4,234,416 A | 11/1980 | Lower et al. | |
| 4,572,782 A | 2/1986 | Smith et al. | |
| 4,575,421 A | 3/1986 | Derrick et al. | |
| 4,576,713 A | 3/1986 | Melin | |
| 4,632,751 A * | 12/1986 | Johnson | B07B 1/42 198/770 |
| 4,732,670 A * | 3/1988 | Nelson | B07B 1/49 209/314 |
| 4,857,176 A | 8/1989 | Derrick et al. | |
| 4,882,054 A | 11/1989 | Derrick et al. | |
| 5,037,536 A * | 8/1991 | Koch | B07B 1/48 209/325 |
| 5,199,574 A * | 4/1993 | Hollyfield, Jr. | B07B 1/42 209/315 |
| 5,273,164 A | 12/1993 | Lyon | |
| 5,322,170 A | 6/1994 | Hadden | |
| 5,332,101 A | 7/1994 | Bakula | |
| 5,337,901 A * | 8/1994 | Skaer | B07B 1/28 209/314 |
| 5,341,939 A * | 8/1994 | Aitchison | B07B 1/42 209/319 |
| 5,417,858 A | 5/1995 | Derrick et al. | |
| 5,417,859 A | 5/1995 | Bakula | |
| 5,494,173 A * | 2/1996 | Deister | B07B 1/42 209/326 |
| 5,538,139 A | 7/1996 | Keller | |
| 5,749,471 A | 5/1998 | Andersson | |
| 6,142,308 A | 11/2000 | Sakti et al. | |
| 6,431,366 B2 | 8/2002 | Fallon | |
| 6,540,089 B2 | 4/2003 | Brock et al. | |
| 6,669,027 B1 | 12/2003 | Mooney et al. | |
| 6,736,271 B1 | 5/2004 | Hall | |
| 6,820,748 B2 | 11/2004 | Fallon | |
| 7,228,971 B2 | 6/2007 | Mooney et al. | |
| 7,578,394 B2 | 8/2009 | Wojciechowski et al. | |
| 8,002,116 B1 | 8/2011 | Cato | |
| 8,439,203 B2 | 5/2013 | Wojciechowski et al. | |
| 8,439,984 B2 | 5/2013 | Hughes | |
| 8,443,984 B2 | 5/2013 | Wojciechiwski et al. | |
| 9,010,539 B2 | 4/2015 | Lipa et al. | |
| 9,027,760 B2 | 5/2015 | Wojciechowski et al. | |
| 9,409,209 B2 | 8/2016 | Wojciechowski | |
| 9,718,008 B2 | 8/2017 | Peresan et al. | |
| 9,884,344 B2 | 2/2018 | Wojciechowski | |
| 10,046,363 B2 | 8/2018 | Wojciechowski | |
| 2002/0153287 A1 | 10/2002 | Fallon | |
| 2008/0093268 A1 | 4/2008 | Hukki et al. | |
| 2009/0294335 A1 | 12/2009 | Roppo et al. | |
| 2013/0220892 A1 | 8/2013 | Wojciechowski et al. | |
| 2013/0313168 A1 | 11/2013 | Wojciechowski | |
| 2014/0262978 A1 | 9/2014 | Wojciechowski | |
| 2014/0263103 A1 | 9/2014 | Peresan et al. | |
| 2015/0224541 A1 * | 8/2015 | Dickinson | B07B 1/42 209/325 |
| 2016/0158805 A1 * | 6/2016 | Massman | B07B 1/4609 209/315 |
| 2016/0207069 A1 | 7/2016 | Pomerleau | |
| 2016/0310994 A1 | 10/2016 | Wojciechowski | |
| 2017/0058621 A1 | 3/2017 | Bailey | |
| 2017/0320098 A1 * | 11/2017 | Knorr | B07B 11/06 |
| 2018/0104719 A1 | 4/2018 | Colgrove et al. | |

FOREIGN PATENT DOCUMENTS

| | | |
|---|---|---|
| CN | 201183045 Y | 1/2009 |
| CN | 201337984 Y | 11/2009 |
| CN | 201711281 U | 1/2011 |
| CN | 202207662 U | 5/2012 |
| CN | 103153488 A | 6/2013 |
| CN | 203917144 U | 11/2014 |
| CN | 204220470 U | 3/2015 |
| CN | 106824768 B | 6/2017 |
| DE | 3601671 A1 | 7/1987 |
| GB | 2532173 A | 5/2016 |
| KR | 101646993 | 8/2016 |
| SU | 423521 A1 | 4/1974 |
| SU | 1080883 A1 | 3/1984 |
| UA | 90981 | 6/2010 |

\* cited by examiner

APPARATUSES, METHODS, AND SYSTEMS FOR VIBRATORY SCREENING

CROSS-REFERENCE TO RELATED APPLICATIONS

This application is a continuation-in-part of U.S. patent application Ser. No. 15/785,141, filed Oct. 16, 2017, which claims the benefit of U.S. Provisional Patent Application No. 62/408,514, filed Oct. 14, 2016, and U.S. Provisional Patent Application No. 62/488,293, filed Apr. 21, 2017. This application also claims priority to U.S. Design patent application No. 29/644,138, filed Apr. 15, 2018, and U.S. Design patent application No. 29/679,608, filed Feb. 7, 2019. The disclosures of each of these applications is incorporated herein by reference in its entirety.

DETAILED DESCRIPTION

Figure 1:
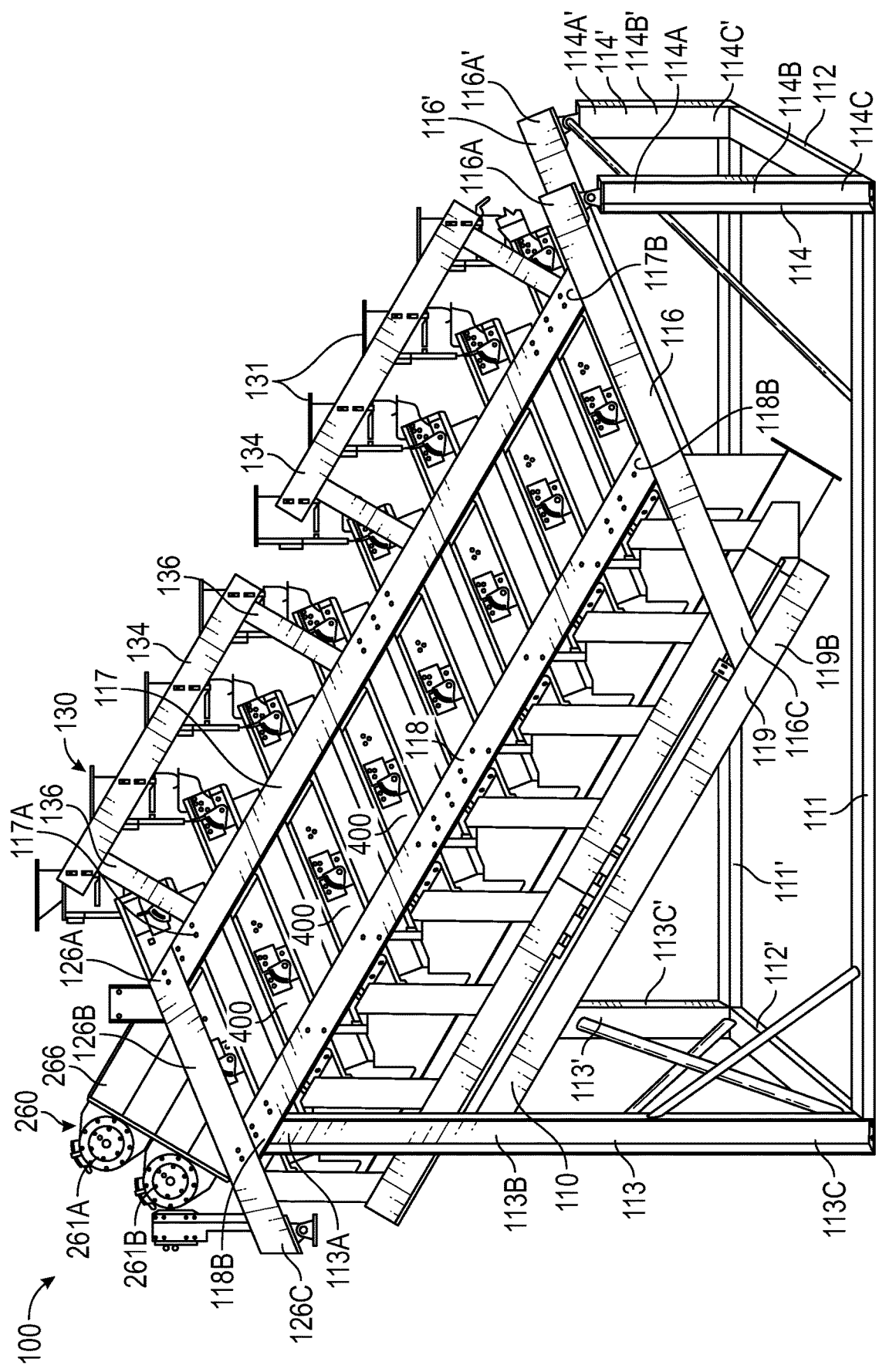
FIG. 1 is a perspective side view of a vibratory screening machine, according to one or more embodiments of the present disclosure.

The present disclosure relates generally to methods and apparatuses for screening materials, in particular, for separating materials of varying sizes. Embodiments of the present disclosure include screening systems, vibratory screening machines, and apparatuses for vibratory screening machines and screen assemblies for separating materials of varying sizes.

Vibratory screening systems are disclosed in U.S. Pat. Nos. 6,431,366 B2 and 6,820,748 B2, which are incorporated herein by reference thereto. Advantages of the present invention over previous systems include a larger screening capacity for separation of materials without an associated increase in machine size. Embodiments of the present invention include improved features such as: screening deck assemblies having first and second screens; tensioning devices that tension each screen in a front to back direction (i.e., in the direction of flow of the material that is being screened); wash trays positioned in between the first and second screens; feed chutes configured to connect directly to an over-mounted feed system, e.g., the feed systems described in U.S. Patent App. No. 2014/0263103 A1, which is incorporated herein by reference hereto; centralized discharge assemblies which collect undersized and oversized materials; and replaceable screen assemblies configured for front to back tensioning and impact areas for flow of material onto the screen assemblies. These features, among others described herein, provide for a compact design that allows for a direct overhead feed system, increased screening capacity, and reduced footprint. Additionally, the multiple screen assemblies that are tensioned front to back with wash trays in between and impact areas on the screen assemblies themselves provide for improved flow characteristics and efficiencies. The improved tensioning structures provide for quick and easy replacement of screen assemblies. The improved discharge assemblies are configured for optimal or nearly optimal flow characteristics as well as for providing the greatly reduced footprint. These improvements and advantages, and others, are provided by at least some embodiments in accordance with aspects of this disclosure.

Example embodiments of the present disclosure employ vibratory screening machines to separate materials of varying sizes. In some embodiments, a vibratory screening machine includes a framing assembly, a plurality of screening deck assemblies mounted to the framing assembly, an undersized material discharge assembly and an oversized material discharge assembly. The framing assembly includes an inner frame mounted to an outer frame. A plurality of screening deck assemblies are mounted to the inner frame and arranged in a stacked and staggered relationship. Each screening deck assembly includes a first screening deck and a second screening deck, a wash tray extending between first and second screening decks, and a tensioning assembly. At least one vibrating motor may be attached to the inner frame and/or at least one screening deck assembly. An undersized material discharge assembly and an oversized material discharge assembly, each of which may include at least one vibratory motor, are in communication with each screening deck assembly, and are configured to receive undersized and oversized screened material, respectively, from the screening deck assemblies.

In one embodiment of the present disclosure, a vibratory screening machine includes an outer frame, an inner frame connected to the outer frame, a vibratory motor assembly secured to the inner frame such that it vibrates the inner frame. A plurality of screen deck assemblies is attached to the inner frame in a stacked arrangement, each configured to receive replaceable screen assemblies. The screen assemblies are secured to the screen deck assemblies by tensioning the screen assemblies in a direction that a material to be screened flows across the screen assemblies. An undersized material discharge assembly is configured to receive materials that pass through the screen assemblies, and an oversized material discharge assembly is configured to receive materials that pass over a top surface of the screen assemblies. The undersized material discharge assembly includes an undersized chute in communication with each of the screen deck assemblies and the oversized material discharge assembly includes an oversized chute assembly in communication with each of the screen deck assemblies.

The oversized chute assembly may include a first oversized chute assembly and a second oversized chute assembly. The undersized chute, the first oversized chute assembly, and the second oversized chute assembly may be located beneath the plurality of screen deck assemblies, and the undersized chute may be located between the first and second oversized chute assemblies. At least one of the plurality of screen deck assemblies may be replaceable. Each screen deck assembly may include a first screen assembly and a second screen assembly. A wash tray may be located between the first screen assembly and the second screen assembly. A trough may be located between the first screen assembly and the second screen assembly. The trough may include an Ogee-weir structure.

The vibratory screening machine may include a screen tensioning system that includes tensioning rods that extend substantially orthogonal to the direction of flow of the material being screened. The tensioning rods may be configured to mate with a portion of the screen assembly and tension the screen assembly when rotated. The screen tensioning system may include a ratcheting assembly configured to rotate the tensioning rod such that it moves between a first open screen assembly receiving position to a second closed and secured screen assembly tensioned position.

The vibratory screening machine may include a vibratory motor, wherein the vibratory motor is attached to the oversized chute assembly. The vibratory screening machine may include multiple feed assembly units, each feed assembly unit located substantially directly below individual discharges of a flow divider. The vibratory screening machine may include at least eight screen deck assemblies.

The oversized chute assembly may include a bifurcated trough that is configured to receive materials that do not pass through the screen assemblies and are conveyed over a discharge end of the screen deck assemblies. A first section of the bifurcated trough may feed the first oversized chute assembly, and a second section of the bifurcated trough may feed the second oversized chute assembly.

In one embodiment of the present disclosure, a screen deck assembly includes a first screen deck configured to receive a first screen assembly, a second screen deck configured to receive a second screen assembly located downstream from the first screen deck assembly; and a trough located between the first and second screen deck assemblies, wherein the first screen deck assembly is configured to receive a material to be screened and the trough is configured to pool the material to be screened before it reaches the second screen deck assembly.

The trough may include at least one of an Ogee-weir and a wash tray. The screen deck assembly may include a first and a second screen tensioning system, each having tensioning rods that extend substantially orthogonal to the direction of flow of the material to be screened. The first tensioning rod may be configured to mate with a first portion of the first screen assembly when rotated and the second tensioning rod may be configured to mate with a second portion of the second screen assembly when rotated.

The first screen tensioning system may include a first ratcheting assembly configured to rotate the first tensioning rod such that the first tensioning rod moves between a first open screen assembly receiving position to a second closed and secured screen assembly tensioned position. The second screen tensioning system may include a second ratcheting assembly configured to rotate the second tensioning rod such that the second tensioning rod moves between a first open screen assembly receiving position to a second closed and secured screen assembly tensioned position.

In one embodiment of the present disclosure, a method of screening a material includes feeding the material on a vibratory screening machine having a plurality of screen deck assemblies that are configured in a stacked arrangement, each of the screen deck assemblies configured to receive replaceable screen assemblies, the screen assemblies secured to the screen deck assemblies by tensioning the screen assemblies in the direction the material flows across the screen assemblies; and screening the materials such that a undersized material that passes through the screen assemblies flows into an undersized material discharge assembly, and an oversized material flows over an end of the screen deck assembly into an oversized material discharge assembly. The undersized material discharge assembly includes an undersized chute in communication with each of the screen deck assemblies and the oversized material discharge assembly includes an oversized chute assembly in communication with each of the screen deck assemblies.

The oversized chute assembly may include a first and second oversized chute assembly. The undersized chute and first and second oversized chute assemblies may be located beneath the plurality of screen deck assemblies, and the undersized chute may be located between the first and second oversized chute assemblies.

At least one of the plurality of screen deck assemblies may be replaceable. Each screen deck assembly may include a first and a second screen assembly. A trough may be located between the first and second screen assemblies. The trough may include an Ogee-weir structure.

A screen tensioning system may be included having tensioning rods that extend substantially orthogonal to the direction of flow of the material being screened. The tensioning rods may be configured to mate with a portion of the screen assembly and tension the screen assembly when rotated.

FIGS. 1 to 4 illustrate a vibratory screening machine 100. Vibratory screening machine 100 includes a framing assembly having an outer frame 110, and an inner frame 120, a feed assembly 130, a plurality of screening deck assemblies 400, a top vibratory assembly 150, an undersized collecting assembly 160 and an oversized collecting assembly 170.

Figure 2:
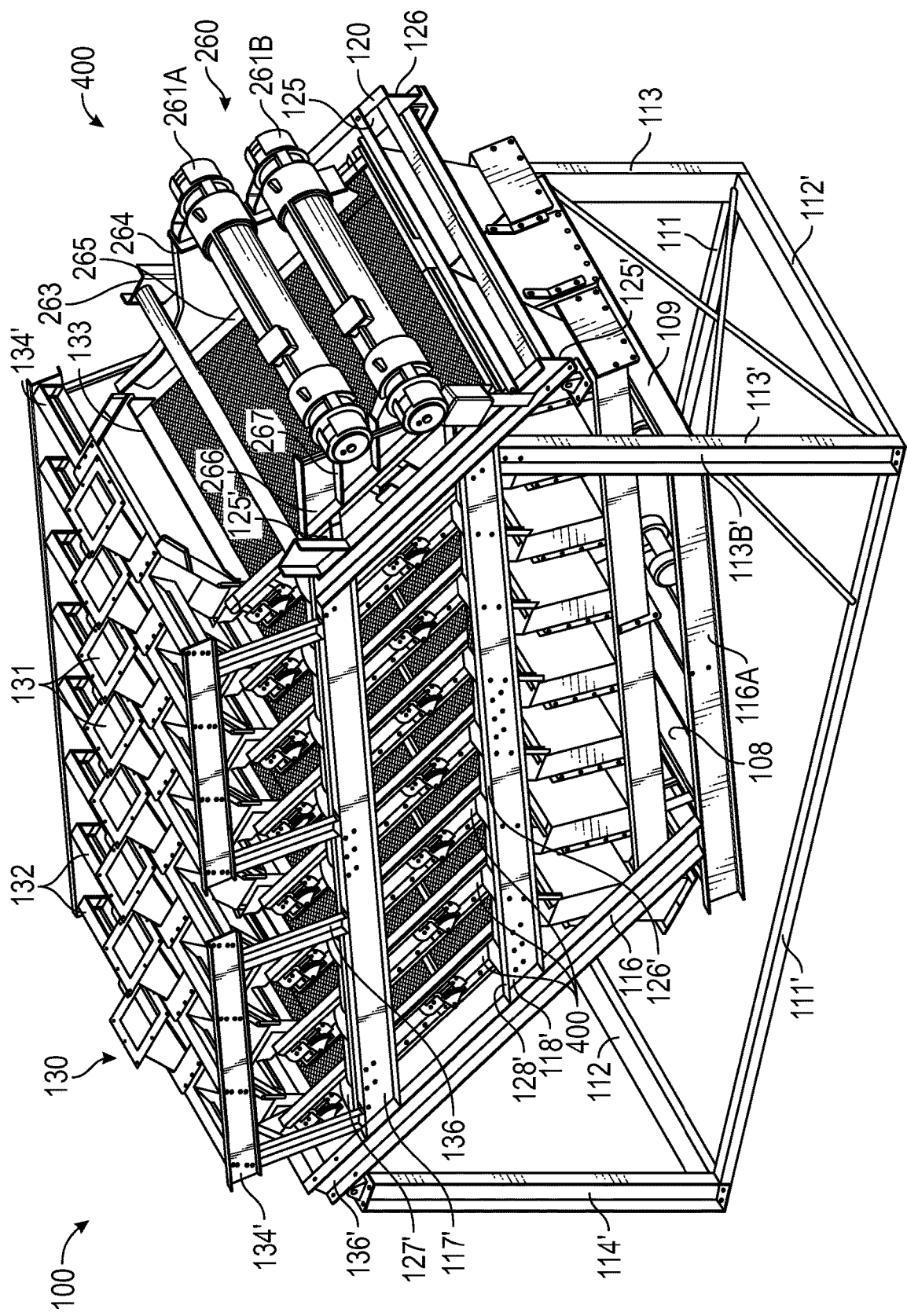
FIG. 2 is a perspective top view of the vibratory screening machine shown in FIG. 1.

FIG. 1 illustrates a side perspective view of vibratory screening machine 100. FIG. 2 illustrates a top perspective view of vibratory screening machine 100, shown from the opposite side of vibratory screening machine 100 as is illustrated in FIG. 1. As is shown in FIG. 2, the opposite side of vibratory screening machine 100 includes mirror image components of outer frame 110 as is shown in FIG. 1. The mirror-image outer frame components are denoted by the addition of a prime (') at the end of the corresponding component reference number.

As is shown in FIGS. 1 and 2, outer frame 110 includes a longitudinal set of base supports 111 and 111', a latitudinal set of base supports 112 and 112', and two sets of upstanding channels, 113 and 113' and 114 and 114'. Upstanding channels 113 and 113' and 114 and 114' each have first ends 113A and 113'A and 114A and 114'A, mid-portions 113B and 113'B and 114B and 114'B and second ends 113C and 113'C and 114C and 114'C, respectively. Each of first ends 113A and 113'A and 114A and 114'A are elevated relative to second ends 113C and 113'C and 114C and 114'C, with mid-portions 113B and 113'B and 114B and 114'B extending the length between the first and second ends, respectively. Outer frame 110 further includes upper angled channels 115 and 115' and lower angled channels 116 and 116'. Upper angled channels 115 and 115' and lower angled channels 116 and 116' each have first ends 115A and 116A, mid-portions 115B and 116B, and second ends 115C and 116C, respectively. First ends 115A and 116A are elevated relative to second ends 115C and 116C, and mid-portions 115B and 116B extend the length between first ends 115A and 116A and second ends 115C and 116C, respectively. Outer frame 110 also includes three sets of declining channels: 117 and 117', 118 and 118', and 119 and 119'. Each declining channel has a first end, 117A, 118A, and 119A which is elevated relative to its respective second end, 117B, 118B, 119B.

Referring to FIGS. 1 and 2, the opposite ends of longitudinal base supports 111 and 111' attach to the opposite ends of latitudinal base supports 112 and 112' such that the four base supports create a rectangular shape. Second ends 113C and 113'C and 114C and 114'C of each respective upstanding channel attach to the four corners where base channels 111 and 111' meet base channels 112 and 112'. Mid-portion 113B and 113'B of upstanding channel 113 attaches to first end 119A of declining channel 119. Second end 119B of declining channel 119 rests above longitudinal base support 111. First end 113A of upstanding channel 113 attaches to mid-portion 115B of upper angled channel 115 and first end 118A of declining channel 118. First end 115A of upper angled channel 115 attaches to first end 117A of declining channel 117. Second end 117B of declining channels 117 attaches to mid-portion 116B of lower angled channel 116 towards first end 116A. Second end 118B of declining channel 118 attaches to mid-portion 116B of lower angled channel 116 toward second end 116C. Second end 116C of lower angled channel 116 attaches to and terminates at second end 119B of declining channel 119.

Referring to FIG. 2, outer frame 110 further includes a rear channel 109 having opposite ends that attach to one of each of mid-portions 113B and 113B' of upstanding channel 113. Additional rear channels 108 run parallel to rear channel 109, each with opposite end attached to lower angled channel 116 and its counterpart lower angled channel 116' from mid-portion 116B toward second end 116C to provide structural support to outer frame 110.

As is shown in FIG. 2, inner frame 120 mounts top vibratory assembly 150 and screening deck assemblies 400 via securing mechanisms, such as bolts. Inner frame 120 includes upper angled channels 125 and 125', lower angled channels 126 and 126', upper declining channels 127 and 127', and lower declining channels 128 and 128'. Upper and lower angled channels 125 and 126 of inner frame 120 run parallel to upper and lower angled channels 115 and 116 on the medial side of outer frame 110. Upper and lower declining channels 127 and 128 of inner frame 120 run parallel to declining channels 117 and 118 on the medial side of outer frame 110. Though not shown in FIGS. 1 and 2, inner frame 120 may be mounted to outer frame 110 with elastomeric mountings, or other similar mountings, which permit inner frame 120 to maintain vibratory motion while dampening the effects of vibration on the structural integrity of fixed outer frame 110. In an embodiment, elastomeric mountings are made of a composite material including rubber and have female threads that accept male bolts from the inner frame and outer frame. The elastomeric mountings may be replaceable parts. While outer frame 110 is shown in the specific configuration described, it may have different configurations as long as it provides the structural support necessary for inner frame 120. In embodiments, vibratory screening machine 100 may have an outer frame that includes feet that are configured to attach to an existing structure.

In some embodiments, top vibratory assembly 150 includes side plates 153 and 153', a first vibrating motor 151A and a second vibrating motor 151B. Side plates 153 and 153' have a top angled edge 154, a bottom edge 155, and an exterior surface 156. Bottom edge 155 of side plate 153 is secured to a side channel 430 of screening deck assembly 400 via securing mechanisms, such as bolts. Exterior surface 156 includes ribs 157 that provide structural support to top vibratory assembly 150. The opposing sides of vibrating motor 151A and second vibrating motor 151B are mounted to top angled edges 154 of side plates 153 and 153'. First and second vibrating motors 151A and 151B are configured such that they may vibrate all screening deck assemblies 400 mounted to inner frame 120. While shown with a particular configuration in FIGS. 1 and 2, it is noted that top vibratory assembly 150 may have other arrangements that retain the functionality described herein.

As is shown in FIG. 2, vibratory screening machine 100 includes a feed assembly 130. Feed assembly 130 includes support frame 134, a plurality of vertical supports 136, feed inlet ducts 131, mounting arms 132, and feed outlet ducts 133. Mounting arms 132 are secured to support frame 134 and 134' with securing mechanisms, such as bolts. Support frame 134 and 134' is located above and parallel to declining channels 117 and 117' of outer frame 110. Vertical supports 136 secure support frame 134 and 134' to declining channels 117 and 117' of outer frame 110 such that feed assembly 130 is fixed relative to vibrating inner frame 120. Inlet ducts 131 are configured to receive a flow of slurry from a flow divider device, such as shown in U. S. Patent Application No. 2014/0263103 A1, which is incorporated herein by reference in its entirety, or other material flow assemblies, and feed it to outlet ducts 133. Outlet ducts 133 are positioned above elevated sides of screening deck assemblies 400 such that each outlet duct 133 is configured to discharge a flow of materials 500 to each screening deck assembly 400. Earlier systems have hoses located a story above vibratory machines, whereas in assemblies of this disclosure, configurations of inlets on the vibratory machine provide for substantially distributed drops in flow and greatly reduce the height of the machine. This is an important space saving feature of at least some embodiments of the present disclosure.

Figure 3:
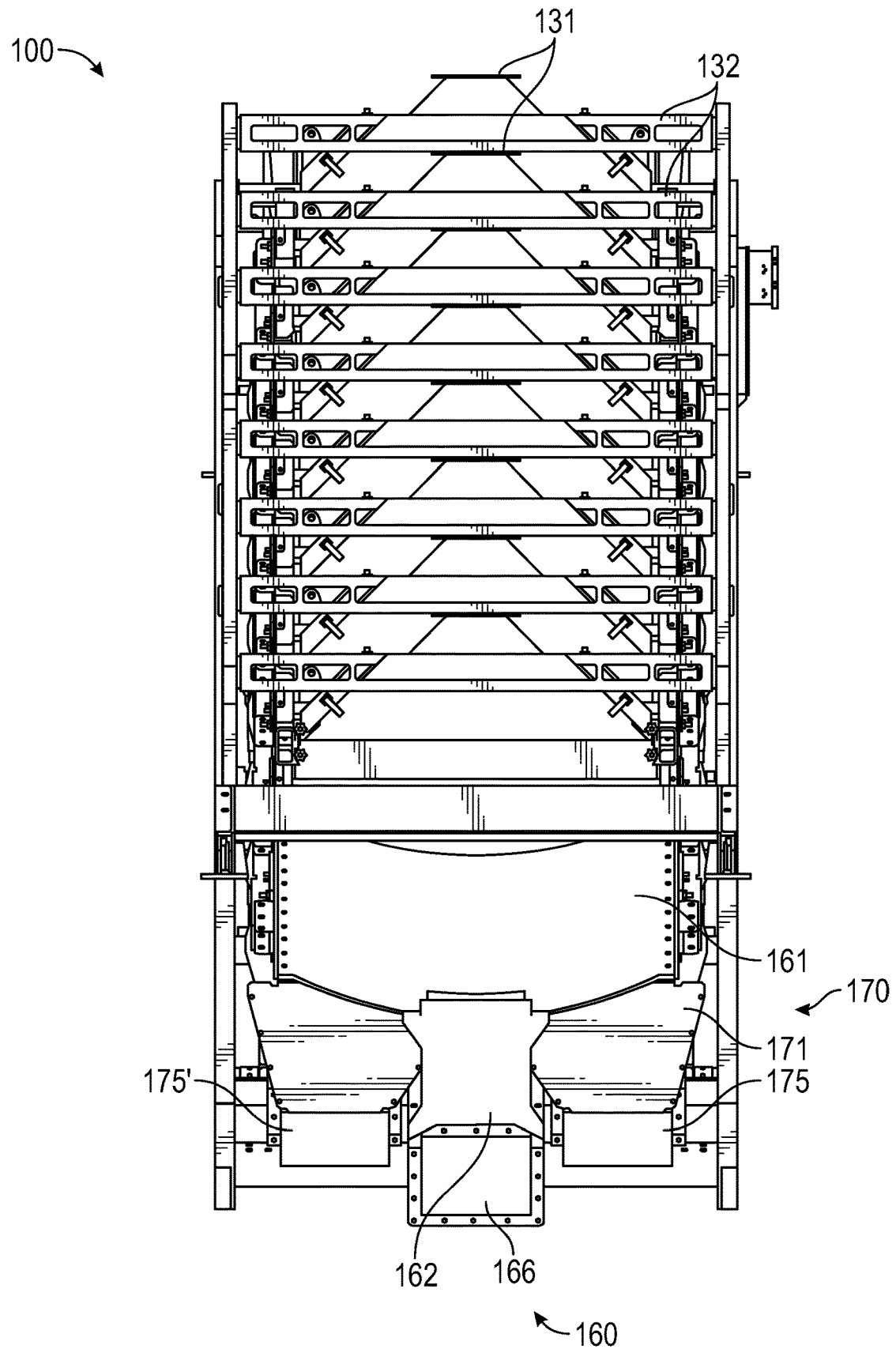
FIG. 3 is a front view of the vibratory screening machine shown in FIGS. 1 and 2.
Figure 4:
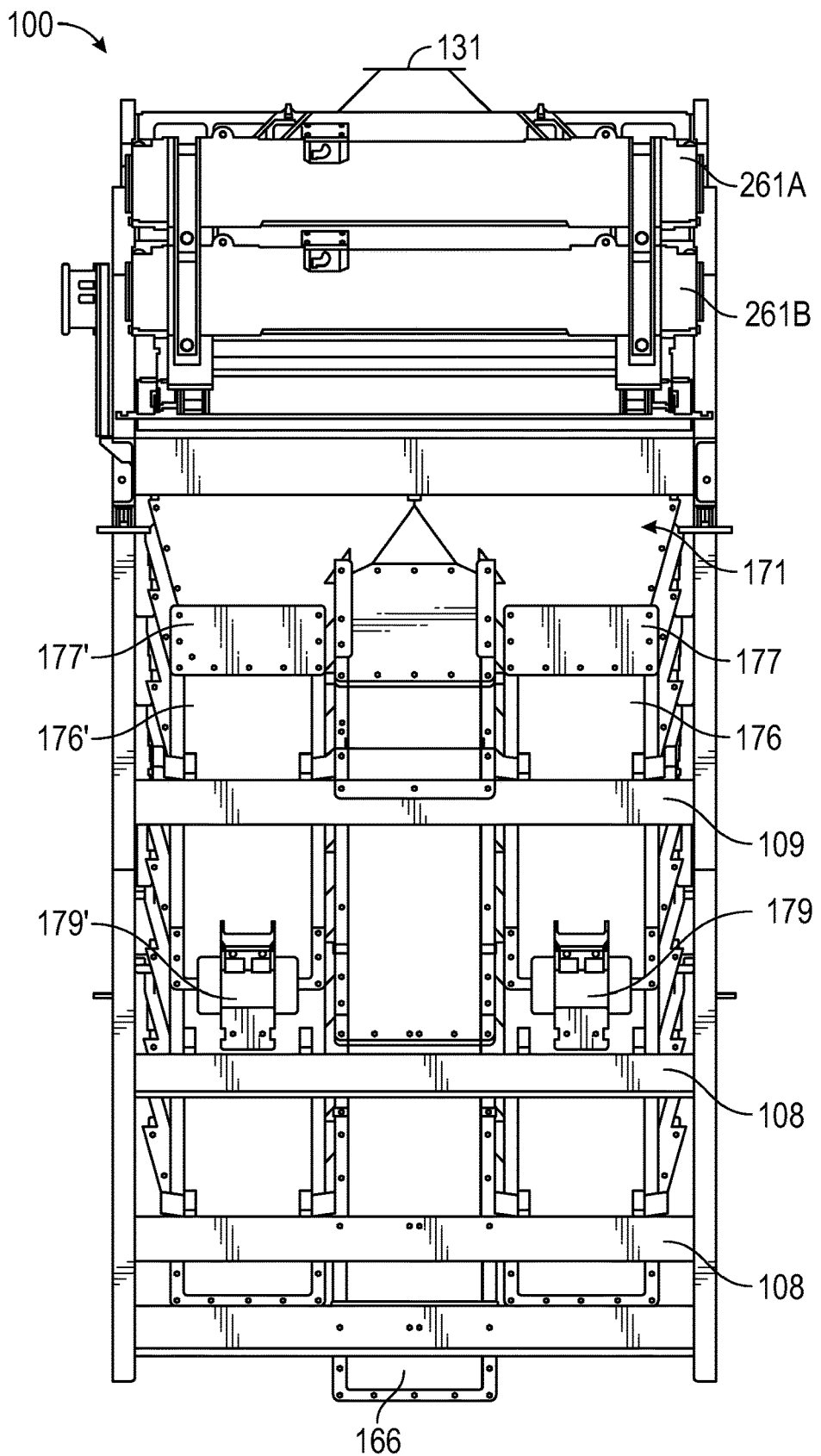
FIG. 4 is a rear view of the vibratory screening machine shown in FIGS. 1, 2, and 3.

FIG. 3 illustrates a front view of the vibratory screening machine 100. FIG. 4 illustrates a rear view of the vibratory screening machine 100. As is shown in FIGS. 3 and 4, the vibratory screening machine 100 includes an undersized material collection assembly 160 and an oversized material collection assembly 170. Referring to FIG. 3, undersized material collection assembly 160 includes a plurality of collecting pans 161 secured to the underside of each screening deck assembly 400, a plurality of ducts 162 in communication with collecting pans 161, and an undersized collecting chute 166. Oversized material collection assembly 170 includes a plurality of oversized collecting chutes 171 mounted to lower end plate 428 of each screening deck assembly 400, and two oversized collecting troughs 176 and 176' in communication with oversized collecting chutes 171. As is shown in FIG. 4, oversized collecting troughs 176 and 176' include vibratory motors 179 and 179'. As is shown in FIGS. 3 and 4, undersized collecting chute 166 extends between oversized collecting chute 171 and oversized collecting troughs 176 and 176' beneath screening deck assemblies 400 of vibratory screening machine 100. Though shown in a specific configuration, oversized collecting troughs 176 and 176' and vibratory motors 179 and 179' may have different arrangements so long as they aid in conveying oversized material 500 discharged from screening deck assemblies across oversized collecting troughs 176 and 176'.

Figure 5:
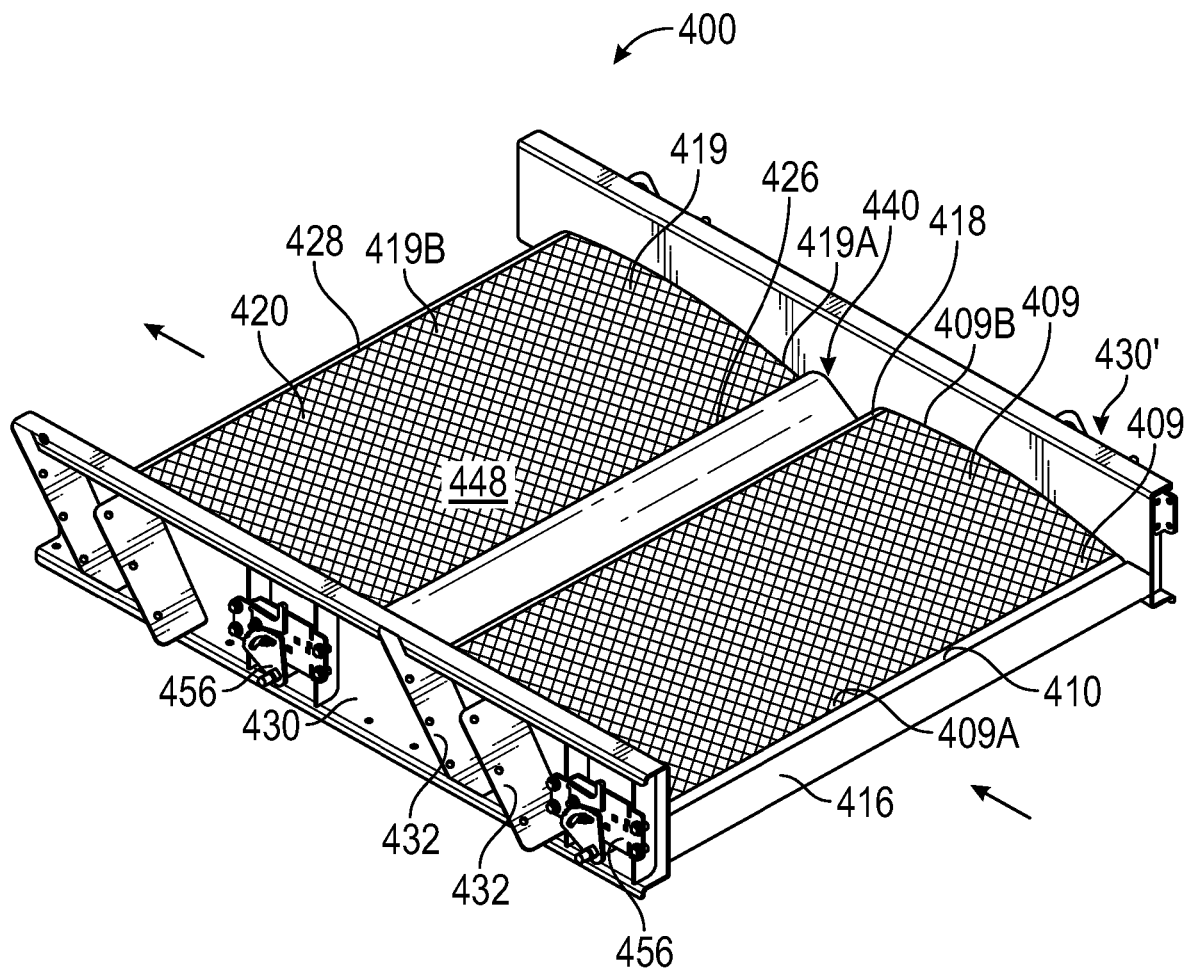
FIG. 5 is an isometric view of a screening deck having screen assemblies mounted thereon, according to one or more embodiments of the present disclosure.

FIGS. 5 to 10 illustrate various views of a screening deck 400. FIG. 5 illustrates an enlarged isometric perspective view of screen assembly 400. Screening deck assembly 400 includes a first screening deck 410, a second screening deck 420, side channels 430 and 430', a wash tray 440, and a tensioning device 450. As is shown in FIG. 5, first screening deck 410 and second screening deck 420 are covered by a first screen assembly 409 and a second screen assembly 419, respectively. First screen assembly 409 and second screen assembly 419 are replaceable screen assemblies which are attached to first and second screening decks 410 and 420. When in operation, material to be screened 500 by vibratory screening machine 100 is discharged from feed outlet ducts 133 of feed assembly 130 to the elevated side of first screen assembly 409, along feed end 409A of first screen assembly 409, and is vibrated across first screen assembly 409 of first screening deck 410, over discharge end 409B of first screen assembly 409, and into wash tray 440. Vibration carries material 500 over wash tray 440, where material passes over feed end 419A of second screen assembly 419. As is described herein, material 500 hits second screen assembly 419 in screen impact area 448, then vibrates across second screen assembly 419 of second screening deck 420, and over discharge end 419B of second screen assembly 419 along lower end plate 428. First screen assembly 409 and second screen assembly 419 are configured such that undersized materials fall through first screen assembly 409 and second screen 419 into undersized material collecting pans 161, and are funneled into undersized collecting chute 166 via ducts 162. Oversized materials do not pass through screens 409 and 419 and are vibrated off lower end plate 428 and funneled through oversized collecting chutes 171 and 171' to oversized collecting troughs 176 and 176'. Direction of the flow of material is represented with large arrows. While illustrated in this particular configuration in the figures, oversized collecting chutes 171 and 171' and oversized collecting troughs 176 and 176' may have different arrangements so long as they receive oversized materials discharged from each screening deck assembly and provide functionality as described herein. The flow of material through split outside oversized collecting chutes 171, 171' and a central undistributed undersized collecting chute 166 provides for efficient flows in reduced space. The configuration of the chutes 166, 171, 171' reduces the footprint of the machine 100 while providing for direct and efficient flow.

First screening deck 410 includes an upper end plate 416 and a lower end plate 418. Second screening deck 420 includes an upper end plate 426 and a lower end plate 428. Opposite sides of first screening deck 410 and second screening deck 420 are secured to the medial sides of side channels 430 and 430' with securing mechanisms such as, e.g., bolts or welding. The lateral sides of side channels 430 and 430' include a plurality of angled plates 432. Angled plates 432 include holes through which securing mechanisms, such as bolts, may extend to secure side channels 430 and 430' to upper declining channel 127 and 127' and lower declining channel 128 and 128' of inner frame 120. While illustrated in this particular arrangement, side channels 430 and 430' and angled plates 432 may have different configurations so long as they permit screening deck assembly 400 to vibrate such that materials 500 of varying sizes are separated as desired.

Figure 6:
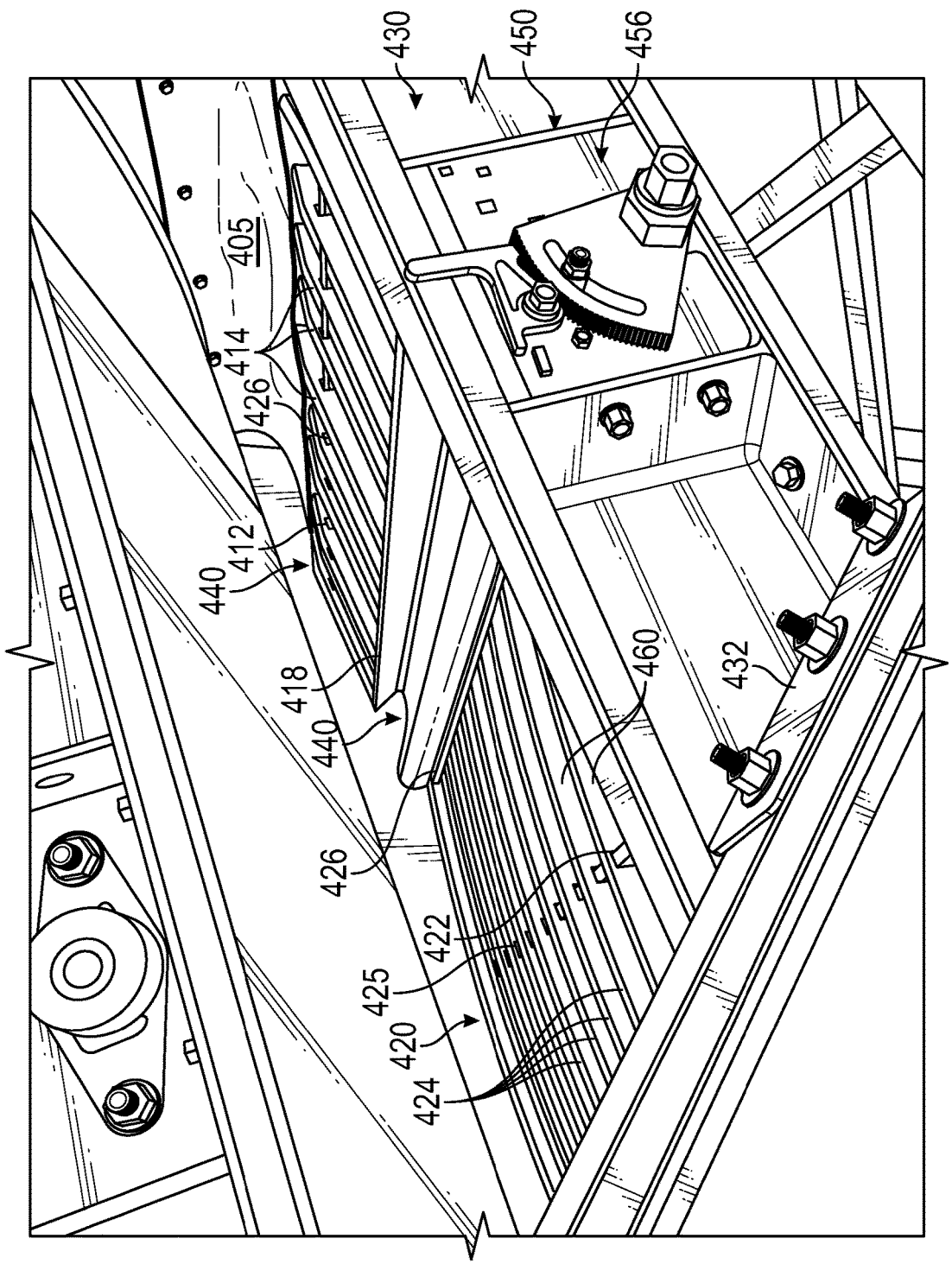
FIG. 6 is an enlarged partial isometric view of the screening deck shown in FIG. 5, without screen assemblies mounted thereon, incorporated into the vibratory screening machine shown in FIGS. 1, 2, 3, and 4.

FIG. 6 illustrates a partial side perspective view of screening decks 410 and 420, wash tray 440, side channel 430, and a portion of tensioning device 450. As is shown in FIG. 6, a flexible material 405 covers outlet duct 133 of feed assembly 130. Flexible material 405 is configured to control the flow of materials from outlet duct 133 to screening deck assembly 400 so that the flow of material is uniformly distributed across screening deck assembly 400, thereby maximizing efficiency of vibratory screening machine 100. As is shown in FIG. 6, first screening deck 410 and second screening deck 420 do not include screens 409 and 419, but it will be appreciated that first and second screening decks 410 and 420 are covered by screens 409 and 419 when vibratory screening machine 100 is employed to separate materials of varying sizes, and can be changed out, as described herein, when worn or damaged. Referring to FIG. 6, first screening deck 410 includes a rib 412, stringers 414, an upper end plate 416 and a lower end plate 418. Second screening deck 420 includes a rib 422, stringers 424, an upper end plate 426 and a lower end plate 428. Opposite ends of ribs 412 and 422 extend from side channel 430 and 430' at each of the midpoints between upper end plate 416 and lower end plate 418 of first screening deck 410, and upper end plate 426 and lower end plate 428 of second screening deck 420, respectively. A plurality of stringers 414 and 424 extend from upper end plates 416 and 426 to lower endplates 418 and 428, respectively. A midpoint 415 of each stringer 414 and a midpoint 425 of each stringer 424 traverses the top surface of ribs 412 and 422. Midpoints 415 and 425 are elevated with respect to opposite ends of stringers 414 and 424 such that stringers 414 and 424 create a "crown" or curvature across first and second screening decks 410 and 420. Though first screening deck 410 and second screening deck 420 are shown with a single rib 412 and 422 respectively, it will be appreciated that first screening deck 410 and second screening deck 420 may include other configurations. First screening deck 410 and second screening deck 420 may include, respectively, a first plurality of ribs and a second plurality of ribs, so long as the additional ribs provide the functionality as described herein. In some embodiments at least one (or, in some embodiments, each one) of the first plurality of ribs and the second plurality of ribs can be assembled similarly to rib 412 or rib 422.

Distinct from screening assemblies of other systems, such as those disclosed in U.S. Pat. No. 6,431,366, stringers 414 and 424 may be replaceable units, and may be bolted to ribs 412 and 422 rather than welded to ribs 412 and 422. This configuration eliminates closely spaced weld joints between ribs 412 and 422 and stringers 414 and 424 that are commonly found in welded screening decks. This arrangement eliminates the shrink, heat distortion and drop associated with closely spaced weld joints, and enables rapid replacement of worn or damaged stringers 414 and 424 in the field. Replaceable stringers 414 and 424 may include plastic, metal, and/or composite materials and may be constructed by casting and/or injection molding. While not shown in FIG. 6, screening decks 410 and 420 are configured to support screens 409 and 419, which extend across the surface of first screening deck 410 and second screening deck 420, covering ribs 412 and 422 and stringers 414 and 424, respectively, as is shown in FIG. 5.

With further reference to FIG. 6, upper end plate 416 of first screening deck 410 is elevated relative to lower end plate 418. Similarly, upper end plate 426 of second screening deck 420 is elevated relative to lower end plate 428. Wash tray 440 extends between lower endplate 418 of first screening deck 410 and upper endplate 426 of second screening deck 420. First screening deck 410, wash tray 440, and second screening deck 420 are configured such that a flow of material from outlet duct 133 and flexible material 405 of feed assembly 130 traverses first screening deck 410 and wash tray 440 before traversing second screening deck 420. This configuration enables a flow of materials to be effectively separated by increasing the surface area on which the flow of materials is screened into oversized material collecting assembly 170 and undersized material collecting assembly 160 without increasing the footprint of vibratory screening machine 100.

Figure 7:
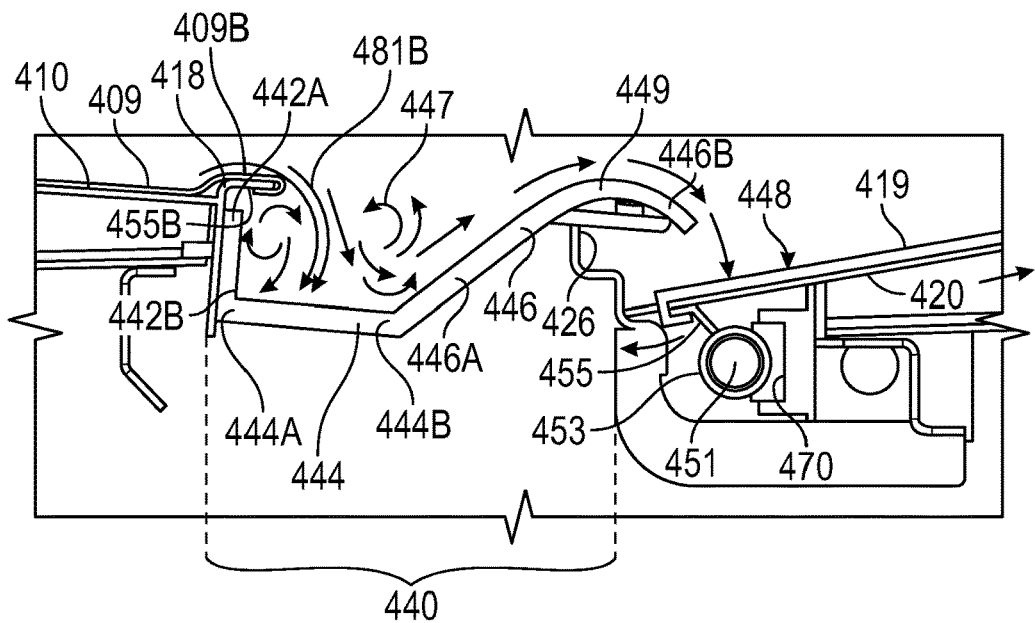
FIG. 7 is an enlarged side view of a wash tray, which may be incorporated into the screening deck shown in FIGS. 5 and 6, according to one or more embodiments of the present disclosure.

FIG. 7 illustrates an isometric side view of wash tray 440 interfacing with first screening deck 410 and second screening deck 420. As is shown in FIG. 7, wash tray 440 includes an upper side member 442 having a top portion 442A and a bottom portion 442B, a lower member 444 having a first end 444A and a second end 444B, and a curved side member 446 including a first end 446A and a second end 446B. Curved side member 446 includes an S-shape curve referred to as an "Ogee," discussed in more detail below. Top portion 442A of upper side member 442 connects to lower end plate 418 of first screening deck 410. Bottom portion 442B of upper side member 442 connects to first end 444A of lower member 444. Second end 444B of lower member 444 connects to first end 446A of curved side member 446. Second end 446B of curved side member 446 curves over upper end plate 426 of second screening deck 420.

The resulting configuration of wash tray 440 generates a weir 447, which is a trough or depression that provides a structure for pooling a flow of liquid or slurry material to be screened 500. Embodiments of a wash tray 440 having an Ogee-weir structure possess functional significance in the field of fluid dynamics. An Ogee-weir structure is generally described as slightly rising up from the base of a weir and reaching a maximum rise 449 at the top of the S-shaped curve of the Ogee structure. Upon or after reaching maximum rise point 449, fluid falls over the Ogee structure in a parabolic form. The discharge equation for an Ogee-weir is:

$$Q = \frac{2}{3} C_d \times L \sqrt{2g(H)^{\frac{3}{2}}}$$

As is shown in FIG. 7, incorporating wash tray 440 with an Ogee-weir curved side member 446 between first screening deck 410 and second screening deck 420 of screening deck assembly 400 may direct the flow of material screened by first screening deck 410 onto a desired impact point or impact area 448 near upper end plate 426 of second screening deck 420, or another desired location, such that the discharge flow impacts the downstream screen panel at a predetermined wear surface as opposed to non-uniformly impacting downstream screen surfaces such as the screen openings. In this configuration, impact point/area 448 may remain unchanged despite changes in fluid parameters such as, e.g., flowrate and/or viscosity. Incorporation of Ogee-weir shaped curved side member 446 into wash tray 440 improves screening efficiency and consistency and reduces wear on second screening deck 420. Flows of materials after impact are represented with large arrows in FIG. 7.

Figure 8:
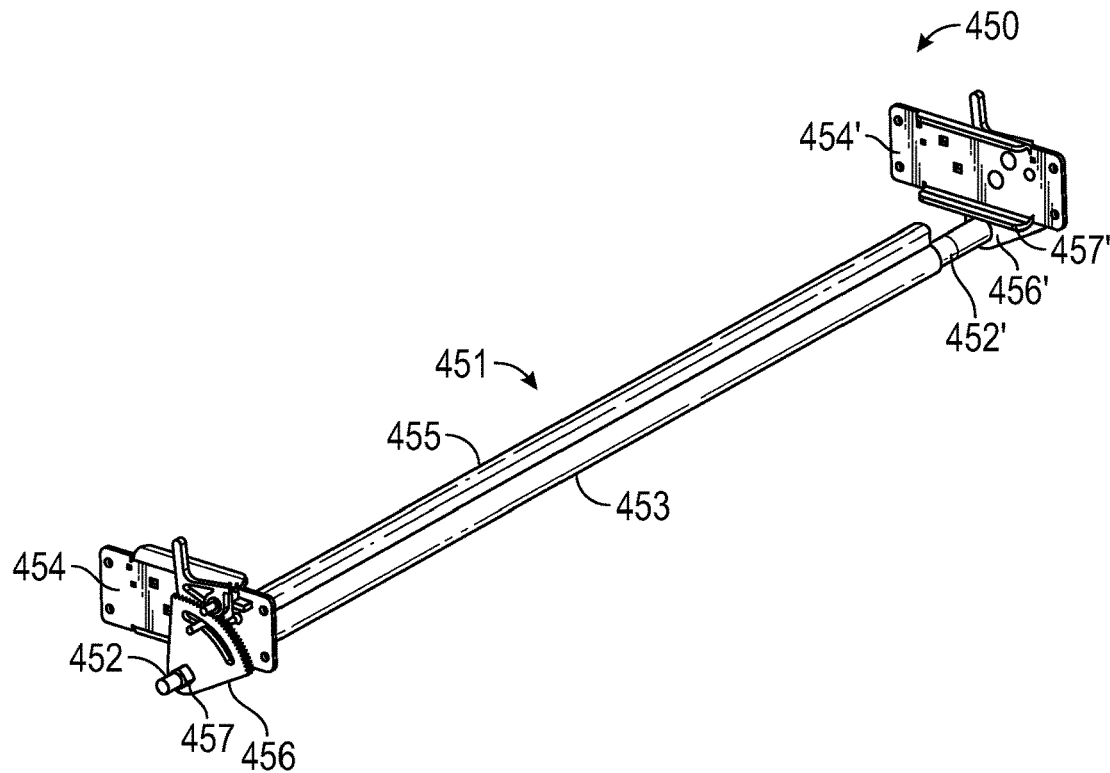
FIG. 8 is an isometric view of a tensioning device with a ratchet mechanism, according to one or more embodiments of the present disclosure.
Figure 9A:
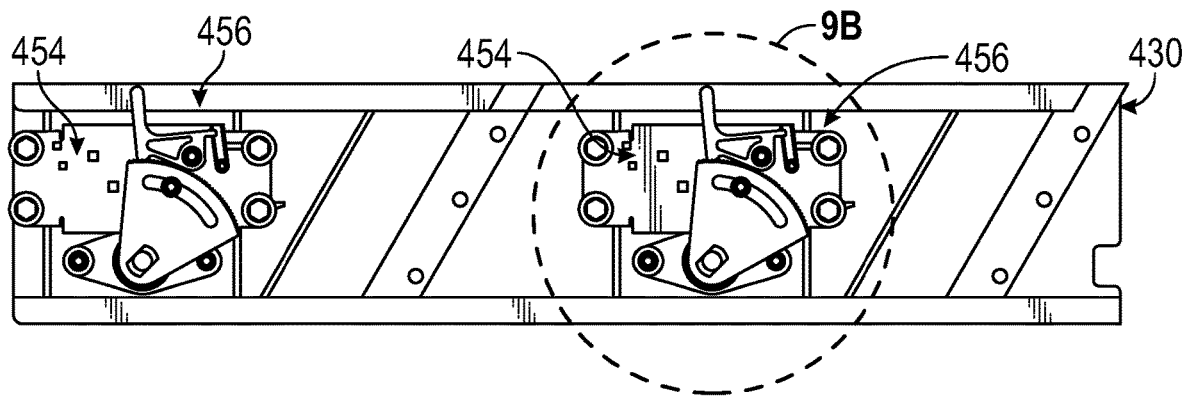
FIG. 9A is a side view of the screening deck shown in FIGS. 5, 6, and 7 with the ratchet mechanism shown in FIG. 8.
Figure 9B:
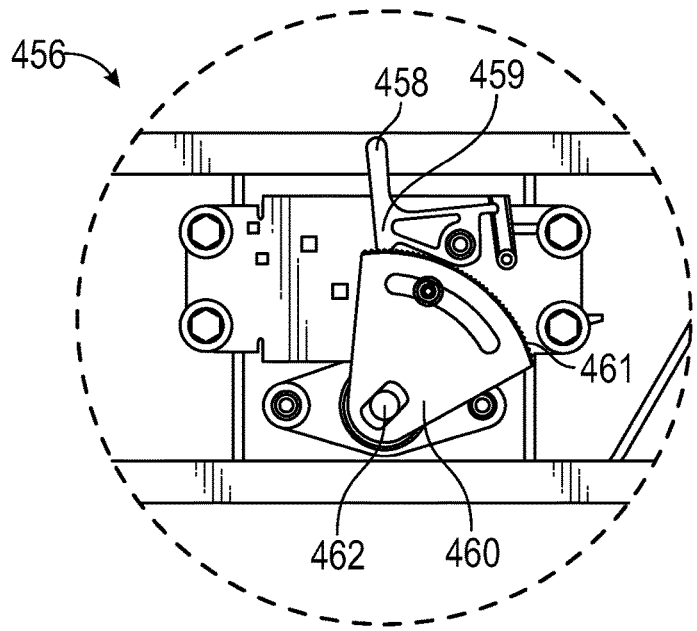
FIG. 9B is an enlarged view of the ratchet mechanism shown in FIG. 9A.

FIGS. 8, 9A and 9B illustrate tensioning device 450. FIG. 8 illustrates an isometric perspective view of tensioning device 450. Tensioning device 450 includes a tensioning rod 451, brackets 454 and 454', and ratchet mechanisms 456 and 456'. FIG. 9A illustrates a partial side view of two ratchet mechanisms 456 and two brackets 454 mounted to side channel 430 of screening deck assembly 400. FIG. 9B illustrates an enlarged view of one of two ratchet mechanisms 456 and brackets 454 shown in FIG. 9A. As described in more detail below, each screening deck assembly 400 includes two tensioning devices 450, one configured to enable tensioning of screen assembly 409 of first screening deck 410, and the other configured to enable tensioning of screen 419 of second screening deck 420.

Referring to FIG. 8, tensioning device 450 includes a tensioning rod 451, brackets 454 and 454', and ratchet mechanisms 456 and 456'. Tensioning rod 451 includes opposing, mirror image ends 452 and 452,' a tubular mid-portion 453, and a tensioning strip 455. Opposing ends 452 and 452' of tensioning rod 451 extend through holes 457 and 457' in ratchet mechanisms 456 and 456', respectively, and are secured to ratchet mechanisms 456 and 456' by securing mechanisms, such as bolts. Ratchet mechanisms 456 and 456' are secured to brackets 454 and 454', which are in turn secured to side channels 430 and 430', respectively, of screening deck assembly 400, by securing mechanisms, such as bolts, as is shown in FIGS. 9A and 9B.

While not shown in FIG. 8, tubular mid-portion 453 of tensioning rod 451 extends the width of screening deck assembly 400 from side channel 430 to side channel 430'. Tensioning rods 451 of each tensioning device 450 are located beneath upper end plate 416 of first screening deck 410 and upper end plate 426 of second screening deck 420. Tubular mid-portion 453 and tensioning strip 455 of tensioning device 450 are configured to receive an end of screen assembly 409 and/or 419. Opposing end 452, tubular mid-portion 453, and tensioning strip 455 of tensioning rod 451 are arranged so that when opposing end 452 and tubular mid-portion 453 rotate in a counter-clockwise direction, tensioning strip 455 rotates in a clockwise direction, thereby pulling screen assembly 409 and/or 419 towards upper end plate 416 of first screening deck 410 and/or upper end plate 426 of second screening deck 420. While shown in FIG. 8 as having tubular mid-portion 453 and tensioning strip 455, tensioning device 450 may include other components so long as it is configured receive an end of screen assembly 409 and/or 419 and is connected to ratchet mechanism 456 so as to permit ratchet mechanism 456 to rotate tensioning rod 451 and pull screen assembly 409 and/or 419 toward upper end plates 416 and/or 426.

FIG. 9A illustrates a partial side view of two ratchet mechanisms 456 and two brackets 454 of two tensioning devices 450 mounted to side channel 430 of screening deck assembly 400. FIG. 9B illustrates an enlarged view of ratchet mechanism 456 and bracket 454. Though not shown, tensioning rods 451 extend from each ratchet mechanism 456 on side channel 430 of screening deck assembly 400 to each ratchet mechanism 456' on opposing side channel 430' beneath upper end plates 416 and 426 of screening deck assembly 400.

Figure 10:
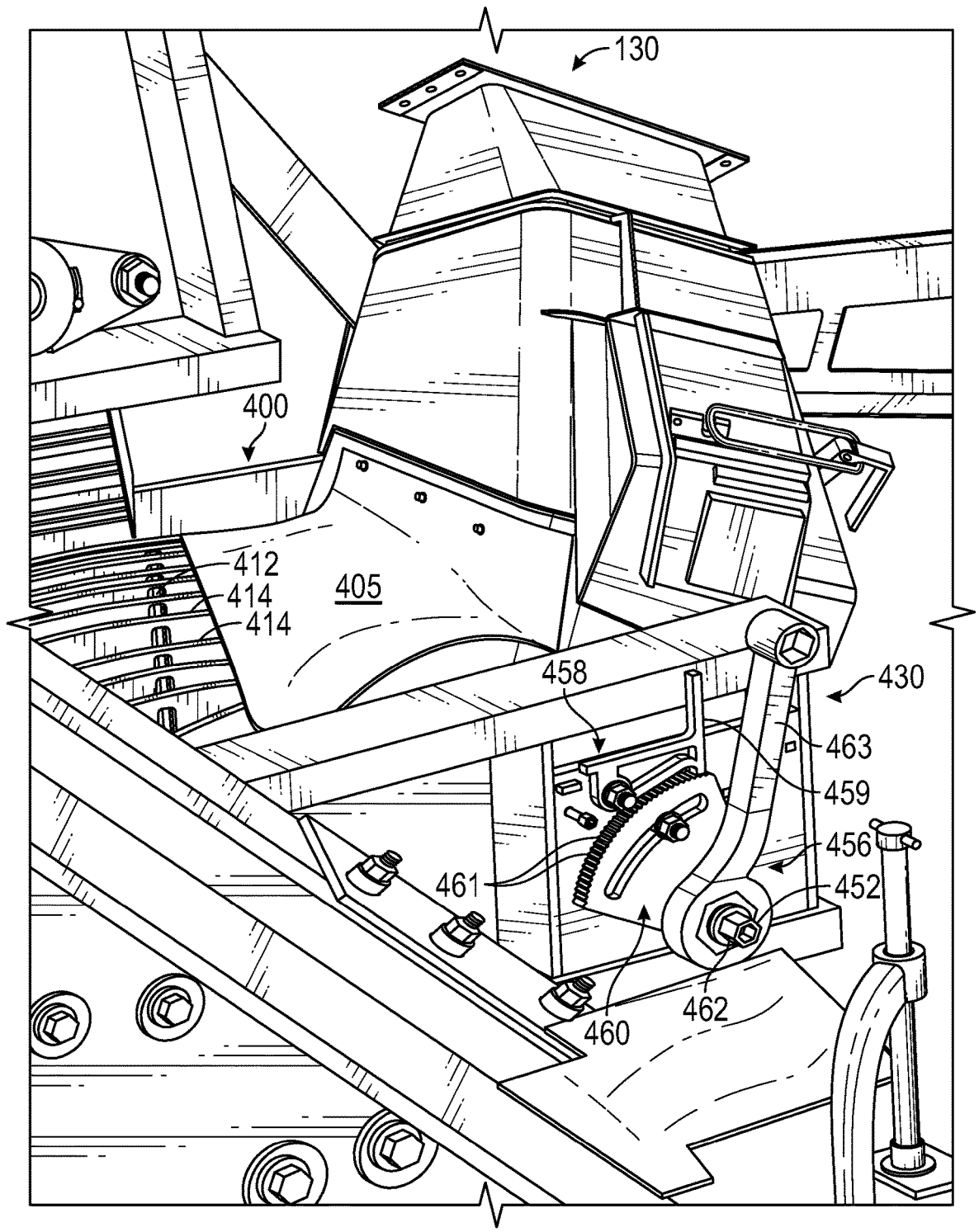
FIG. 10 is an enlarged partial isometric view of a feed assembly and the screening deck shown in FIGS. 5, 6, and 7 secured to the vibratory screening machine shown in FIGS. 1, 2, 3 and 4.

FIG. 10 illustrates an enlarged partial perspective view of ratchet mechanism 456 mounted to side channel 430 below first screening deck 410. First screening deck 410 is shown interfacing with feed assembly 130 and flexible flow controlling material 405. As is shown in FIG. 10, ratchet mechanism 456 includes an upper portion 458 and a lower portion 460. Upper portion 458 includes a locking bar 459 that interfaces with a multitude of teeth 461 on lower portion 460. Lower portion 460 includes an actuation point 462 where second end 452 of tensioning rod 451 extends through hole 457 of ratchet mechanism 456. Referring to FIG. 10, a wrench 463 is configured to rotate actuation point 462 of ratchet mechanism 456. In response to application of a counter-clockwise rotational force to wrench 463, actuation point 462 and tubular mid-portion 453 of tensioning rod 451 are configured to rotate in a counter-clockwise direction, and tensioning strip 455 is configured to rotate in a clockwise direction such that tensioning device 450 pulls an end of screen assembly 409 toward upper end plate 416. In response to rotation of wrench 463 and actuation point 462 of ratchet mechanism 456, locking bar 459 of upper portion 458 and teeth 461 of lower portion 460 are configured to lock the tensioning device in place and retain tension. Whereas tensioning devices used in vibratory screening machines disclosed in the prior art apply tension in a side-to-side direction, or towards side channels 430 and 430' relative to vibratory screening machine 100, tensioning device 450 disclosed herein applies tension in a front-to-back direction, or towards upper end plate 416 and lower end plate 418 of first screening deck 410 and/or upper end plate 426 and lower end plate 428 of second screening deck 420 relative to vibratory screening machine 100. Unlike tensioning devices disclosed in the prior art, the front-to-back direction of tensioning provided by tensioning device 450 corresponds with the direction of the flow of material such as, e.g., slurry, across first and second screening decks as it is separated by vibratory screening machine 100. Though shown with wrench 463 in FIG. 10, other tools may be employed to rotate actuation point 462 of ratchet mechanism 456, so long as it provides functionality as described herein.

Figure 11A:
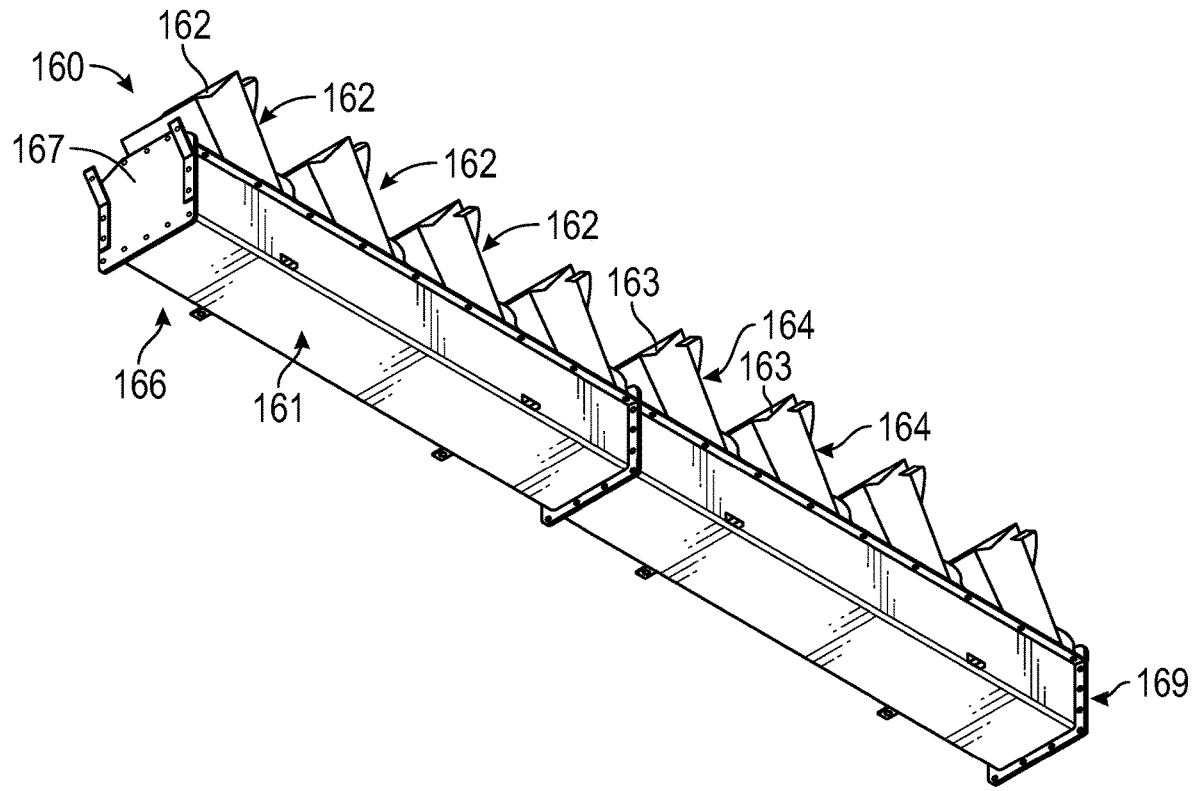
FIG. 11A is an isometric bottom view of an undersized material discharge assembly, according to one or more embodiments of the present disclosure.
Figure 11B:
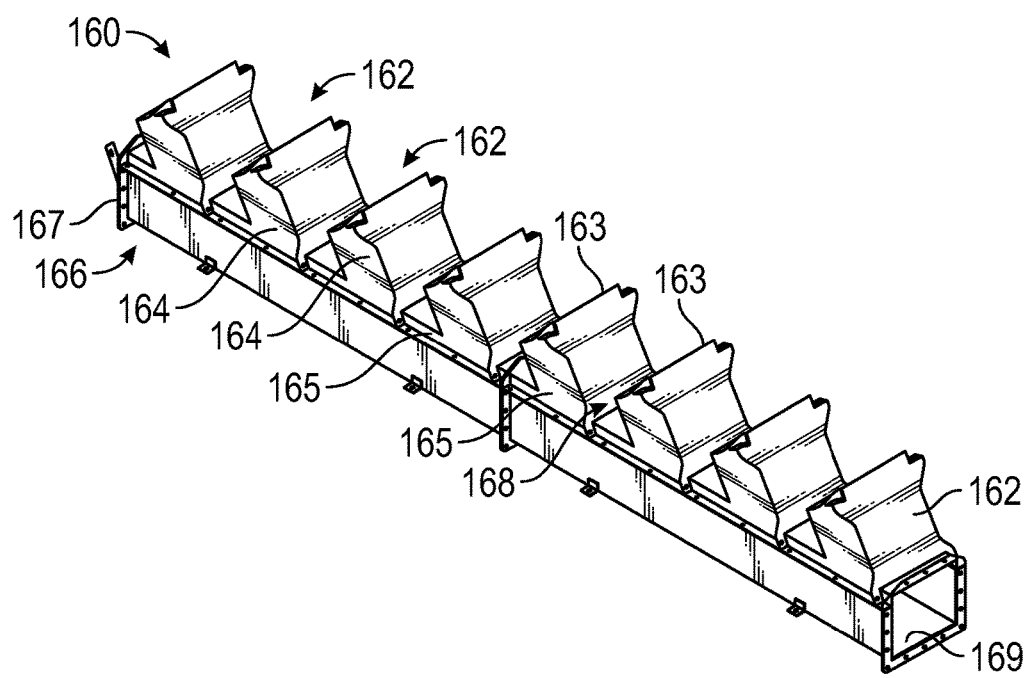
FIG. 11B is an isometric top view of the undersized material discharge assembly shown in FIG. 11A.

FIGS. 11A and 11B illustrate an embodiment of undersized material collection assembly 160. Undersized material collection assembly 160 includes a plurality of collecting pans 161 secured to the underside of each screening deck assembly 400 (see FIGS. 3 and 4), a plurality of ducts 162 in communication with collecting pans 161, and an undersized collecting chute 166. As is shown in FIGS. 11A and 11B, undersized collecting chute 166 includes a mounting end 167, which may be secured to outer frame 110 of vibratory screening machine 100 by securing mechanisms, such as bolts, a top surface 168 that runs the length of collecting chute 166, and a discharge port 169. Each duct 162 includes an inlet 163, a chamber 164, and an outlet 165. Inlet 163 of each duct 162 is configured to receive undersized material from collecting pans 161 and funnel the material through chamber 164 of duct 162 to outlet 165. Each outlet 165 communicates with a portion of top surface 168 of undersized collecting chute 166 such that material discharged from outlets 165 of ducts 162 enters collecting chute 166 and exits through discharge port 169. An undersized material hopper may be configured to receive undersized material discharged from discharge port 169. Though not shown, inlets 163 of ducts 162 may include radial clearances to accommodate vibratory motion from collecting pans 161 (see FIGS. 3 and 4), which are mounted to screening deck assemblies 400, whereas ducts 162 and collecting chute 166 are mounted to fixed outer frame 110. The placement of the undersized collecting chutes directly beneath ducts 162 increases the efficiency of vibratory screening machine 100 and saves space by centralizing the flow of all undersized material into a central channel.

FIGS. 12A and 12B to FIGS. 13A and 13B illustrate oversized material collection assembly 170. Oversized material collection assembly 170 includes a plurality of oversized collecting chutes 171 mounted to lower end plate 428 of each screening deck assembly 400, and two oversized collecting troughs 176 and 176' in communication with oversized collecting chutes 171 (see FIGS. 3 and 4, for example).

Figure 12A:
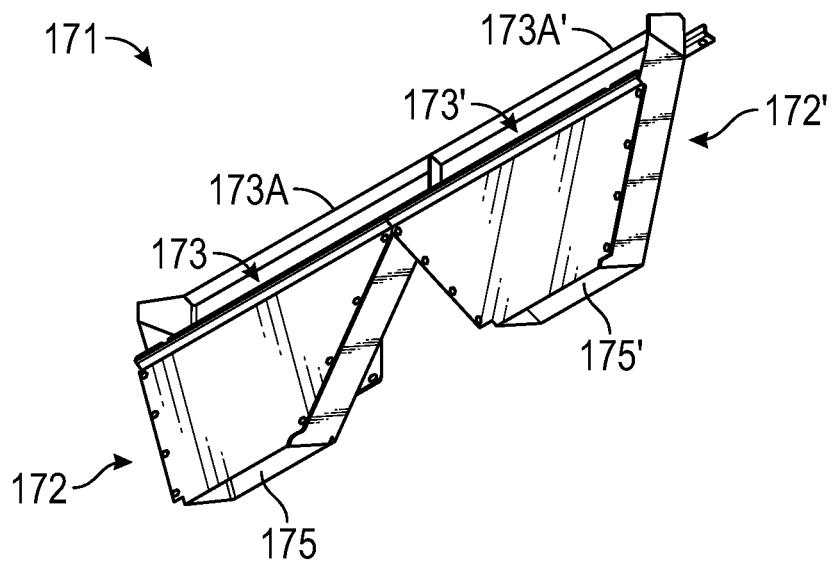
FIG. 12A is an isometric bottom view of an oversized material discharge chute, according to one or more embodiments of the present disclosure.
Figure 12B:
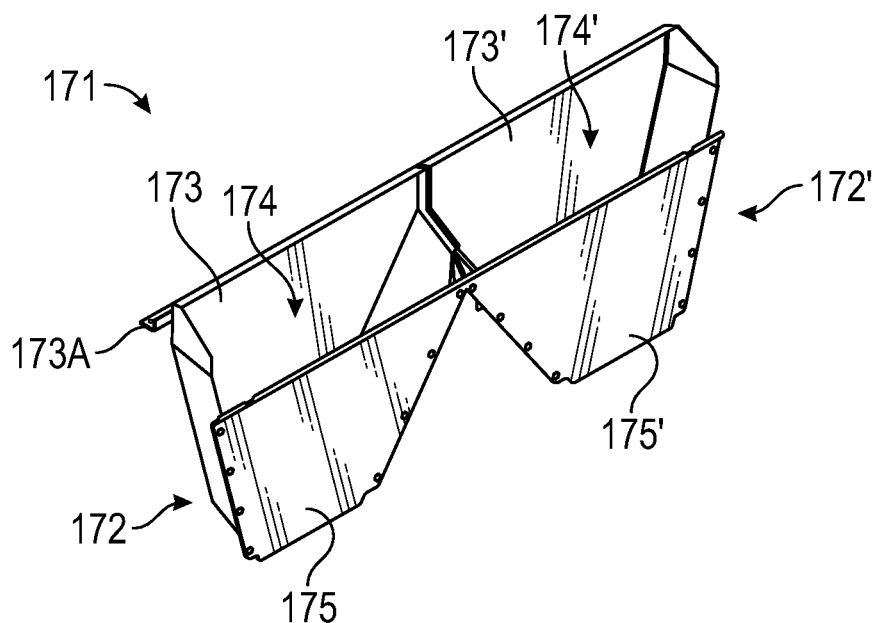
FIG. 12B is an isometric top view of the oversized material discharge chute shown in FIG. 12A.
Figure 13A:
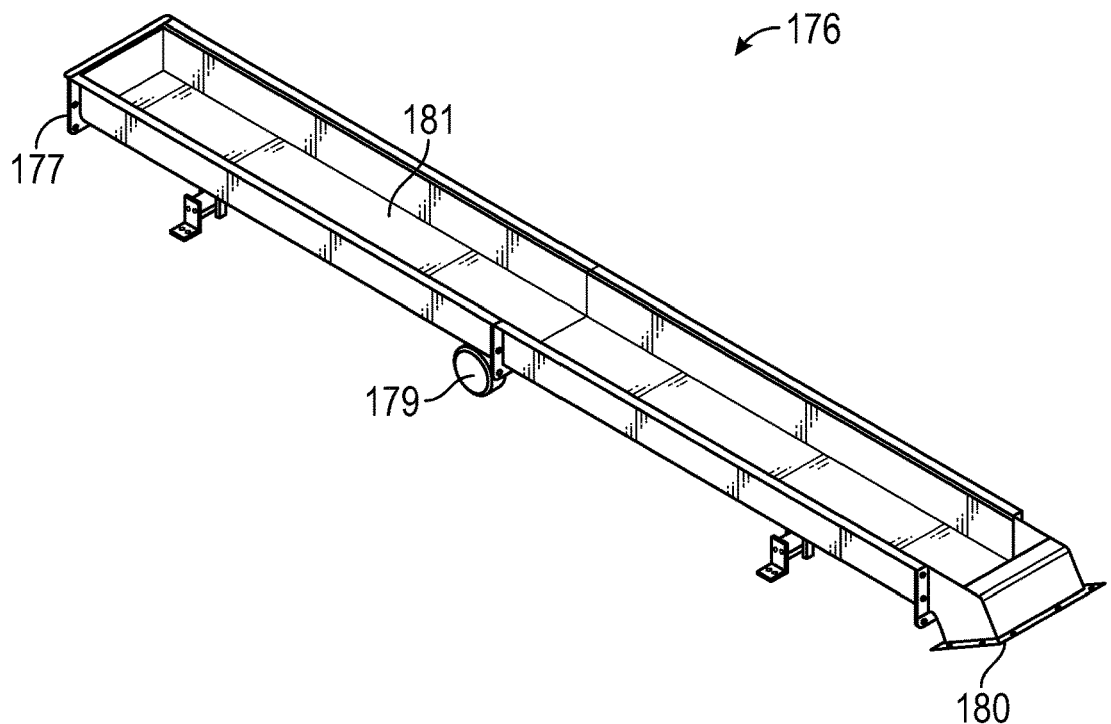
FIG. 13A is an isometric top view of an oversized material discharge trough, according to one or more embodiments of the present disclosure.
Figure 13B:
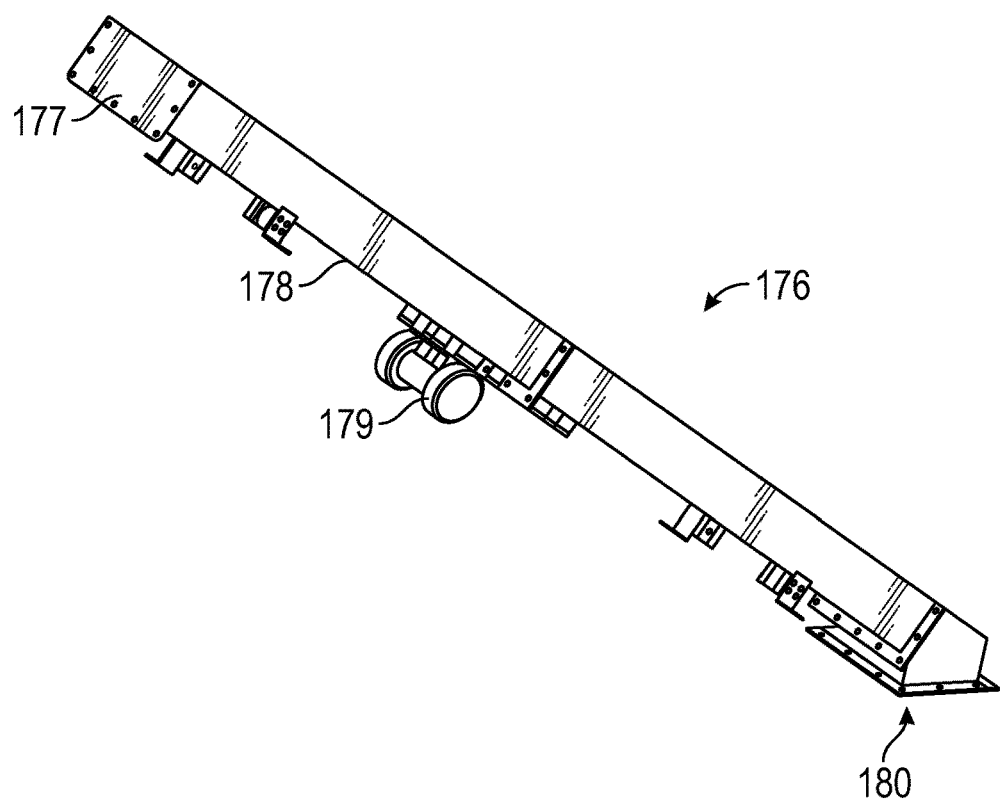
FIG. 13B is an isometric bottom view of the oversized material discharge trough shown in FIG. 13A, according to one or more embodiments of the present disclosure.

FIGS. 12A and 12B illustrate an embodiment of oversized collecting chute 171. FIGS. 13A and 13B illustrate an embodiment of oversized collecting trough 176. Referring to FIGS. 12A & 12B, each oversized collecting chute 171 includes a first side 172 and a second side 172' mirroring first side 172, both having an inlet 173 with a mounting arm 173A, a chamber 174, and an outlet 175. Mounting arms 173A of each oversized collecting chute 171 are secured to each lower endplate 428 of screening deck assemblies 400 with securing mechanisms, such as bolts, such that material that does not pass through screens 409 and/or 419 to undersized discharge assembly rolls off lower endplate 428 of screening deck assemblies 400 into inlet 173 of oversized material collecting chute 171 (see FIGS. 3 to 4, for example). Upon or after entry into inlet 173, oversized material is funneled through chamber 174, and discharged from outlet 175 into oversized collecting trough 176. While shown having a trapezoidal shape, it will be appreciated that oversized collecting chute 171 is not limited to this configuration. Oversized collecting chute 171 may have other arrangements, so long as such a chute can receive oversized material from lower endplate 428 of screening deck assemblies 400 and can transfer oversized material to one of oversized collecting troughs 176 and 176'.

Referring to FIGS. 13A and 13B, oversized collecting trough 176 includes a mounting end plate 177, a back surface 178, an outlet 180, and a channel 181. Mounting end plate 177 is secured to rear channel 129 of inner frame 120 with securing mechanisms, such as bolts (see FIGS. 3 and 4, for example). Channel 181 extends from mounting end plate 177 to outlet 180 beneath each outlet 175 of oversized collecting chutes 171 such that oversized material discharged from each of oversized collecting chutes 171 falls into channel 181 of oversized collecting trough 176. A vibratory motor 179 is mounted to back surface 178 of oversized collecting trough 176 with securing mechanisms, such as bolts, to increase the rate at which oversized material passes through channel 181 to outlet 180, thus increasing the volume of material that vibratory screening machine 100 may process overall. Though not shown, an oversized material hopper may be configured to receive oversized materials discharged from outlet 180 of oversized collecting trough 176.

Figure 14:
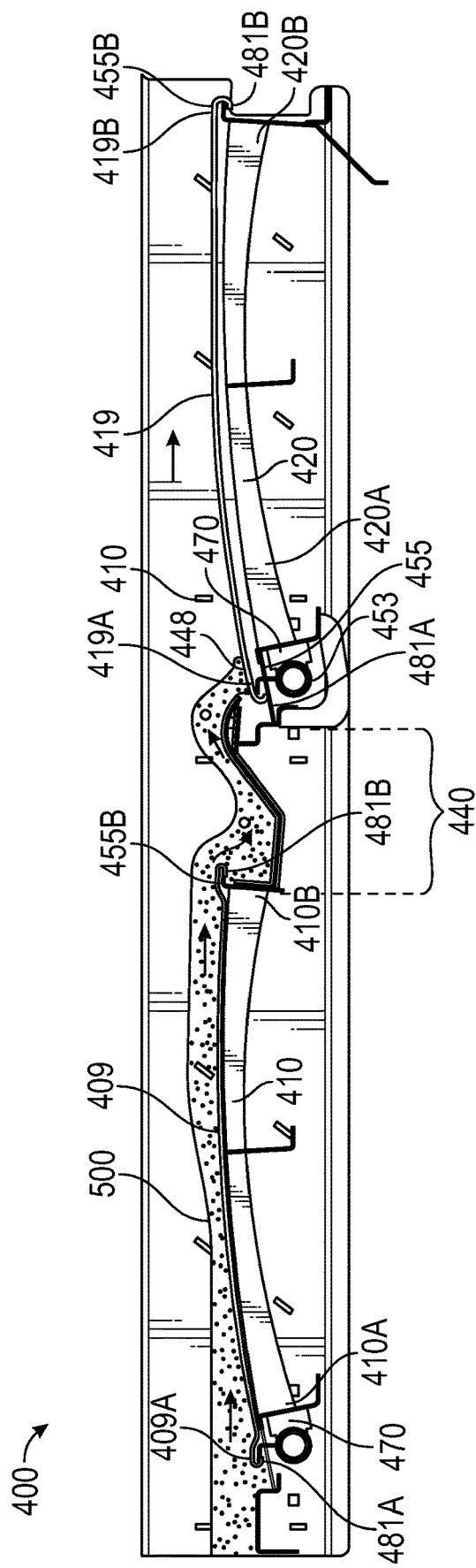
FIG. 14 is a cross-sectional side view of a screening deck having material flowing across the screening deck and featuring an impact area of a screen assembly incorporated into a screening deck assembly, according to one or more embodiments of the present disclosure.

FIG. 14 is a side view similar to FIG. 7 of screening deck assembly 400 showing details of tensioning assembly 450 tensioning second screen 419 along second screening deck 420. As indicated in FIG. 14, material to be screened 500 flows via vibration across first screen assembly 409 toward discharge end 409B of first screen assembly 409. During passage, appropriately sized particles of material 500 pass through openings or pores 488A of first screen assembly 409. After passing over the discharge end 409B of first screen assembly 409B, material 500 passes into wash tray 440 and over curved side member 446 and maximum rise 449. After passing over maximum rise 449, the material 500 lands on an impact area 448 of second tray 419, and then vibrates across second screen 419, passing from input end 419A to discharge end 419B, with appropriately sized particles of material 500 passing through second screen 419 along the way. Screens 409, 419 are selectively affixed to decks 410, 420 via deck clips 455B of the decks 410, 420 and tensioning strips 455 of the tensioning devices 450, in a manner described in greater detail below.

As it can be understood from FIG. 14 and as is explained in further detail below, a discharge end 409B, 419B of screen assemblies 409, 419 is attached to a fixed deck clip 455B, while an opposing input end 409A, 419A is attached to a tensioning strip 455 of tensioning device 450. When tensioning strip 455 is rotated, the screen assembly 409, 419 is tensioned front-to-back across the associated deck 410, 420, in the same direction that material to be screened flows across the screen deck assembly 400. This is an improvement over earlier systems, where screen assemblies were tensioned from the sides, leaving a crown that was perpendicular to the flow of the material to be screened, creating valleys and inefficiencies in flows.

Figure 15:
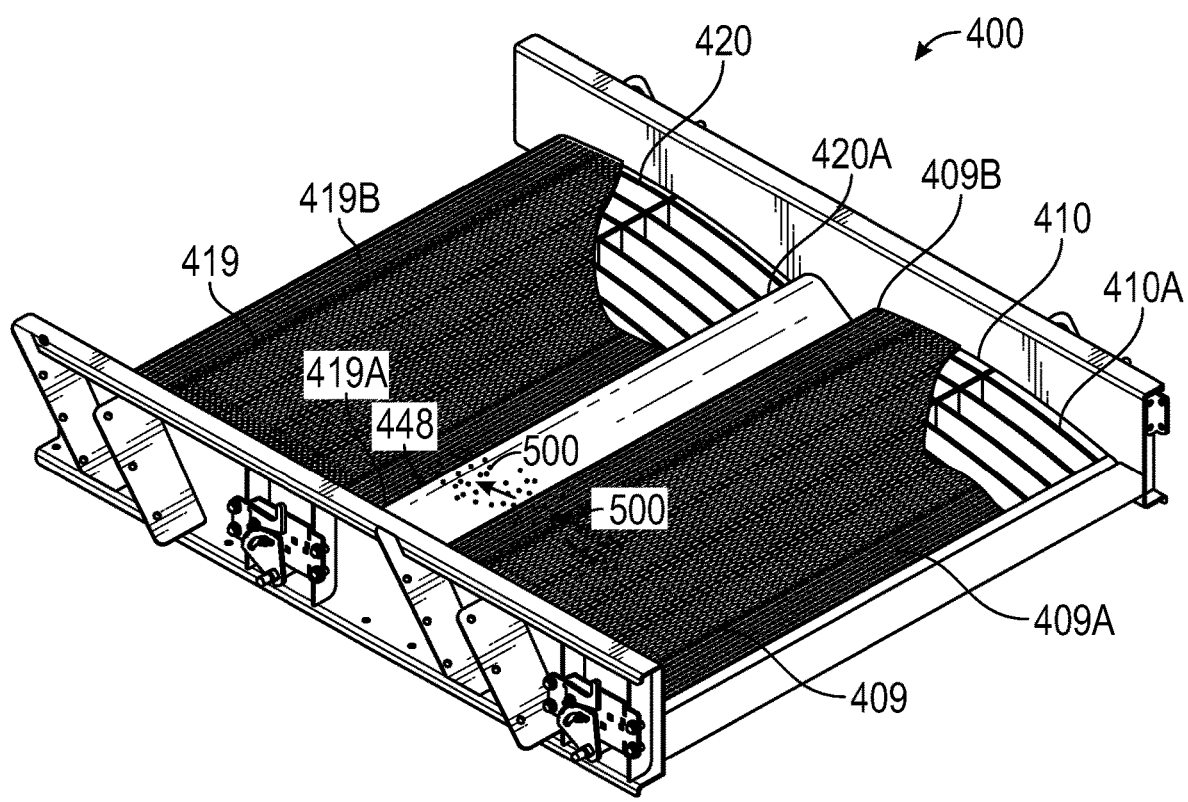
FIG. 15 a side view of a tray showing material to be filtered falling on an impact area of a filter member, according to one or more embodiments of the present disclosure.

FIG. 15 is a side perspective view of a screening deck assembly 400 showing additional details of first and second screen assemblies 409, 419 tensioned over first and second screening decks 410, 420, respectively. In FIG. 15, portions of screens 409, 419 have been cutaway to show aspects of decks 410, 420 below the screens. Material 500 is shown passing over wash tray 440 and crashing onto impact area 448 of second filter 419.

Figure 16:
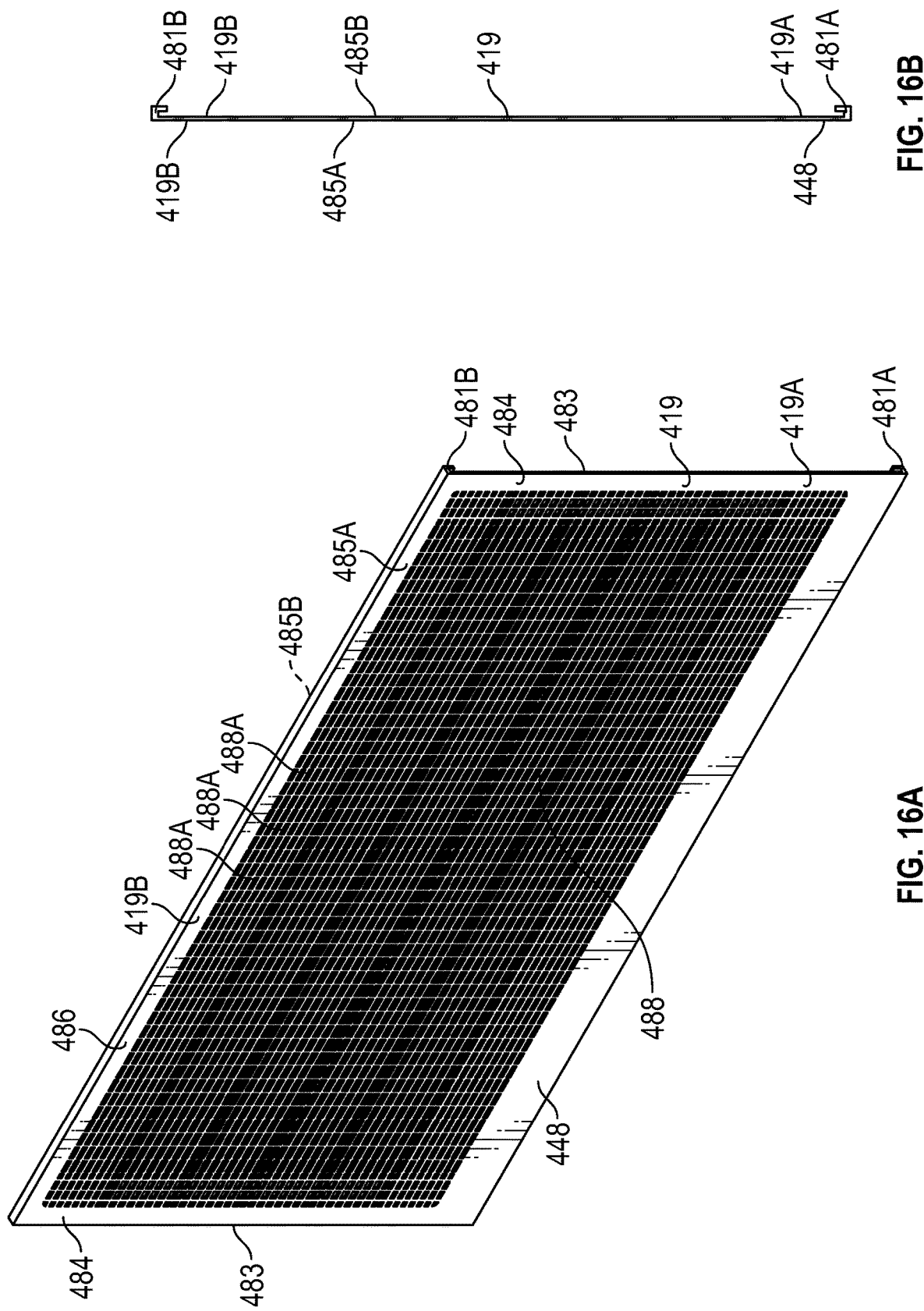
FIG. 16A is a front-side perspective view of a screen assembly, according to one or more embodiments of the present disclosure.
FIG. 16B is a side view of a screen filter for use in an embodiment of the present disclosure.

FIGS. 16A and 16B show views of a screen assembly 419 for use with the vibratory screening machine 100 and screening deck assembly 400 described above. While the following description of embodiments depicted in FIGS. 16A and 16B is made with reference to second screen assembly 419, it is noted that this discussion applies equally to first screen assembly 409; first screen assembly 409 can typically be identical to screen assembly 419, but optionally may have different sizes and configurations, e.g., different sized impact area 448 (smaller or larger), different size opening configurations, a combination thereof, or the like.

FIG. 16A is a front-side perspective view of screen 419 in accordance with one or more embodiments of the disclosure. Screen 419 is configured for removably securing to deck 420 under tension in the manner described herein. Screen 419 includes feed end 419A and opposing discharge end 419B. Screen 419 has a widthwise dimension between ends 419A and 419B, and a lengthwise dimension between opposing side edges 483. A filter area 488 is defined by a plurality of individual openings or pores 488A extending substantially across the surface of the screen 419. The openings 488A are of a selected size, such as a size determined by side lengths having respective magnitudes in a range from about 20 microns and about 100 microns. In some embodiments, the openings 488A can be rectangular shaped and can have a substantially uniform width or substantially uniform thickness in a range between about 43 microns to about 100 microns, and a substantially uniform length in a range between about 43 microns to about 2000 microns.

In the embodiment of FIG. 16A, the filter area 488 is framed by an impact zone 448 formed along feed end 419A, a strip 486 along discharge end 419B, and opposing side strips 484 along respective side edges 483. Ends of the impact zone 448, strip 486, and side strips 484 integrally join together at abutment points, and together provide structural support to the filter area 488, preventing tearing and the like during placement and use on the machine 100. With reference to FIG. 14, as material 500 flows over the curved member 446 of the wash tray 440, the material 500 lands on impact zone 448. Impact zone 448 protects the integrity of the individual openings 488A and prevents or decreases the likelihood of large particles becoming lodged in the openings 488A. As indicated in FIG. 14, as material 500 flows from feed end 419A to discharge end 419B, appropriately sized particles of material 500 pass through openings 488A.

Impact zone 448 may have different sizes and configurations depending on the screening application and desired flow characteristics.

As is shown in FIGS. 16A and 16B, a first binder strip 481A is provided along feed end 419A, while a second binder strip 481B is provided along discharge end 419B. Each binder strip 481A, 481B may be a generally U-shaped strip of metal that is integrated into feed ends 419A, 419B, substantially along the length of each respective end 419A, 419B. While alternative means may be used to attach binder strips 481A, 481B to screen 419, the binder strips 481A, 481B are configured to withstand substantial forces during operation of the vibratory screening machine 100 without separating from screen 419 or otherwise allowing screen 419 to come loose from deck 420.

FIG. 16B is a side view of a screen filter 419 for use in an exemplary embodiment of the present disclosure. When viewed from the side as in FIG. 16B, screen 419 presents a thin profile. As seen in FIG. 16B, the screen filter 419 includes a material input surface 485A on an upper side, and a material output surface 485B on an opposing lower side thereof. Individual screen openings 488A extend from input side 485A to output side 485B, such that during vibratory screening, individual particles pass through the screen area 488. In the embodiment depicted in FIG. 16B, first and second binder strips 481A, 481B depend downward from the lower side of screen 419. Each binder strip 481A, 481B curves back toward a center of screen 419, such as in an L-shape or C-shape.

The screen assembly 409, 419 is dimensioned to match the size of deck 410, 420. In some embodiments, screen assembly 409, 419 preferably has a length of about 56 cm, a width of about 30 cm, and a thickness of about 0.25 cm. Impact area 448 is about 3 cm wide; narrower or wider impact areas 448 can be used, with the former decreasing protection and the latter decreasing the number of openings 488A. Strip 486 and side strips 484 are about 1 cm wide. The screens 409, 419 are preferably made of polyurethane. While exemplary embodiments of screens 419 are depicted in FIG. 16A and FIG. 16B for use with the vibratory screening machine 100 described herein, it will be appreciated that the machine 100 can be configured for use with alternative configuration of screens, screen materials, and screen characteristics (opening/pore size, connection mechanisms, and the like). Examples of screens, screen materials and screen characteristics that can be incorporated into screens 409, 419 for use with machine 100 are found in applicant's U.S. Pat. No. 9,409,209, U.S. Patent Application Publication 2013/313,168A1, U.S. Patent Application Publication 2014/0262978A1, and U.S. Patent Application Publication 2016/0310994A1, the disclosures of which are incorporated herein by reference in their entirety.

A method of attaching a screen assembly 409, 419 to a deck 410 420 will now be described. As is seen in FIG. 14, deck clips 455B are fixed adjacent to respective output ends 410B, 420B of decks 410, 420. Deck clips 455B are sized and configured for attaching output ends 409B, 419B of screens 409, 419 to screening decks 410, 420. In an embodiment, deck clips 455B extend substantially along a length of discharge end 410B, 420B, in a manner analogous to binder strips 481A, 481B extending along lengths of screen assembly 409, 419. In FIG. 14, deck clip has an L-shaped aspect when viewed in side profile, although other engagement configurations, such as curved C-shaped aspects, can be used. As can be understood from FIG. 14, second binder strip 481B along discharge end 409B, 419B of a screen assembly 409, 419 is engaged to deck clip 455B, such that the L- or C-shaped aspect of binder strip 481B interdigitates with L- or C-shaped aspect of deck clip 455B. Tension is applied to spread screen assembly 409, 419 across the deck 410, 420 toward input end 410A, 420A, such that binder clip 481B remains interconnected with deck clip 455B. With screen assembly 409, 419 spread across deck 410, 420, first binder strip 481A of screen assembly 409, 419 is then engaged to tensioning strip 455 of tensioning device 450, such that an L- or C-shaped aspect of tensioning strip 455 interconnects with first binder strip 481A. Tension is then applied to screen assembly 409, 419 via tensioning device 450 to thereby selectively lock first binder strip 481A to tensioning strip 455, whereby filter 409, 419 is tensioned tightly along deck 410, 420 for use in screening particles of material 500 during operation of the machine 100.

After a period of use, screens 409, 419 can be selectively removed from deck 410, 420 for replacement with new screens 409, 419. In a method of screen removal, tensioning device 450 is used to release tension strip 455 from first strip 481A. Screen assembly 409, 419 is then pulled or slid toward discharge end 410A, 420A of deck 410, 420 to release second binder strip 481B from deck clip 455B.

Figure 17:
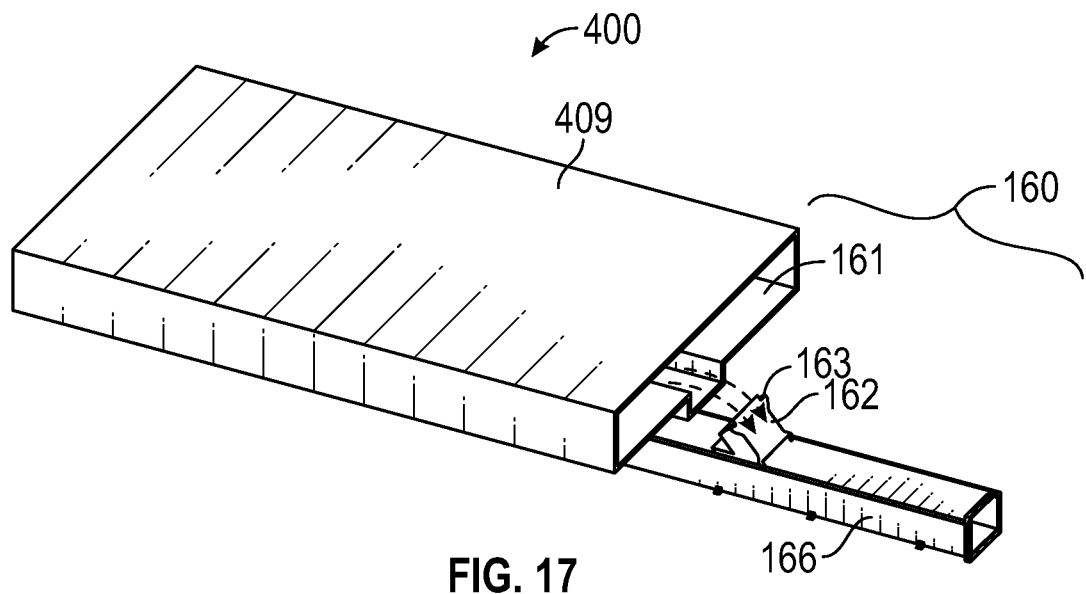
FIG. 17 illustrates a flow of undersized materials in a screening assembly, according to one or more embodiments of the present disclosure.

FIG. 17 illustrates a flow of undersized materials in a screening assembly, according to one or more embodiments of the present disclosure. In this example, a screen deck assembly 400 includes a screen 409 and an undersized material collection assembly 160. Undersized material collection assembly 160 includes a collecting pan 161 which collects fluid and undersized materials that flow through a screen surface of screen 409. Undersized material collection assembly 160 is configured to allow fluids and undersized materials to leave screen deck assembly 400 and to flow into an inlet 163 of ducts 162 of an undersized collection chute 166.

Figure 18:
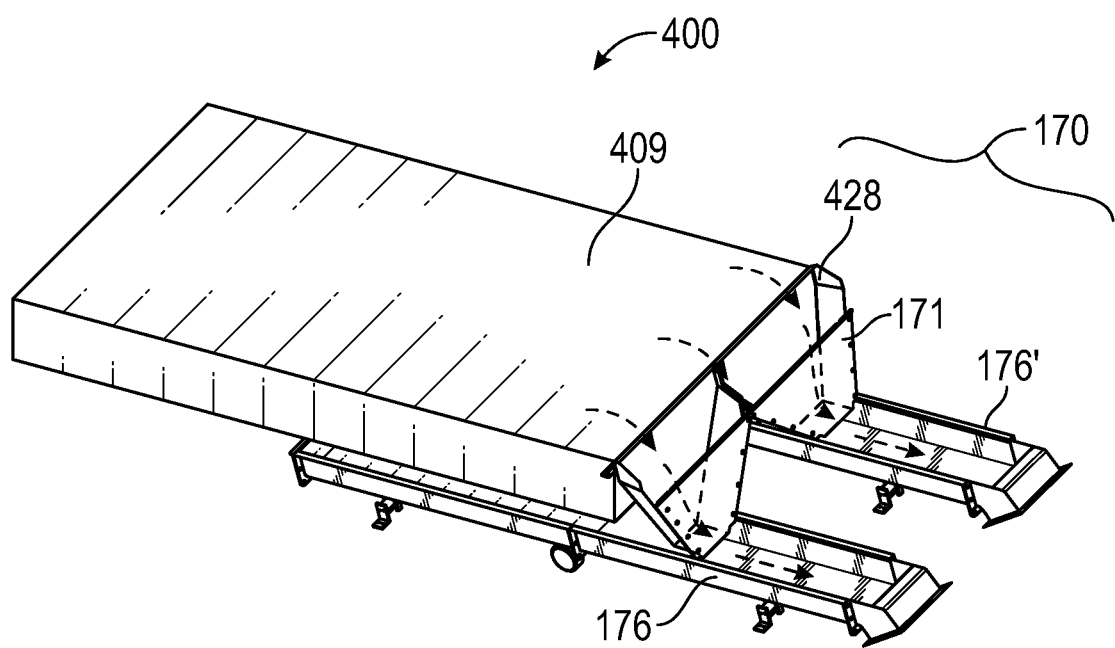
FIG. 18 illustrates a flow of oversized materials in a screening assembly, according to one or more embodiments of the present disclosure.

FIG. 18 illustrates a flow of oversized materials in a screening assembly, according to one or more embodiments of the present disclosure. In this example, an oversized material collection assembly 170 includes an oversized collecting chute 171 that is mounted to lower end plate 428 of screening deck assembly 400. Oversized material collection assembly 170 further includes two oversized collecting troughs 176 and 176' in communication with oversized collecting chute 171. As shown, oversized material that does not flow through the screen surface of screen 409 is collected by oversized collecting chute 171 and fed to collecting troughs 176 and 176'.

Figure 19:
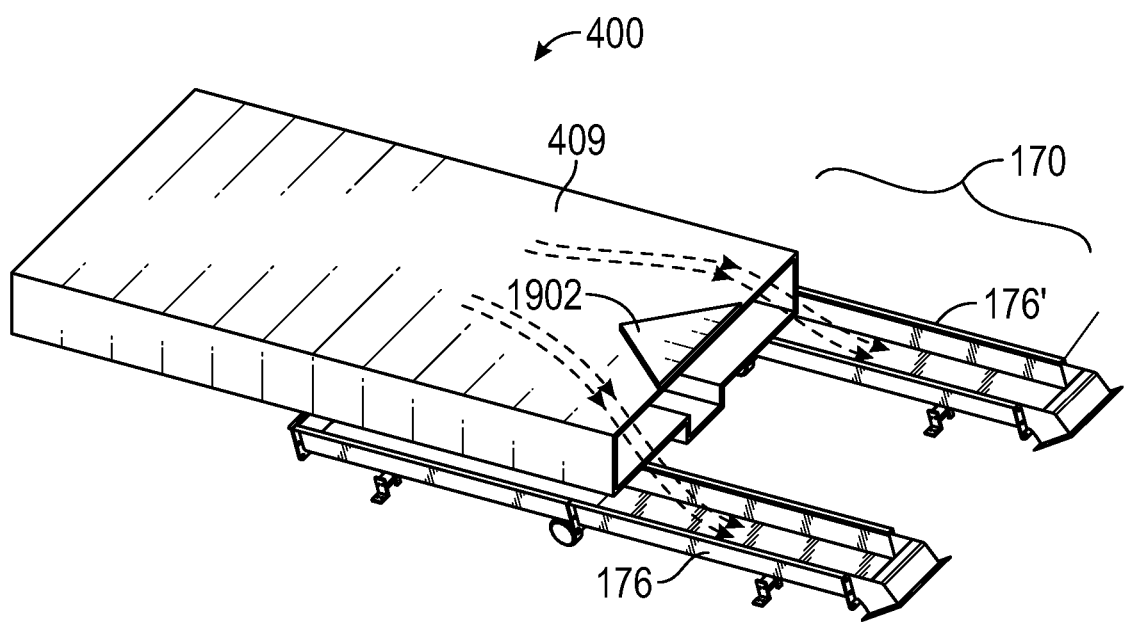
FIG. 19 illustrates a flow of oversized materials in a screening assembly, according to one or more embodiments of the present disclosure.

FIG. 19 illustrates a flow of oversized materials in a screening assembly, according to one or more embodiments of the present disclosure. In this example, oversize material collection assembly 170 does not have oversized collecting chute 171 (e.g., see FIG. 18). Rather, in this embodiment, a deflector 1902 causes oversized material that does not pass through the surface of screen 409 to flow past deflector 1902 to thereby be guided to collecting troughs 176 and 176'. In this example, deflector 1902 may be a triangular deflector that is configured to reside on the surface of screen 409.

Figure 20:
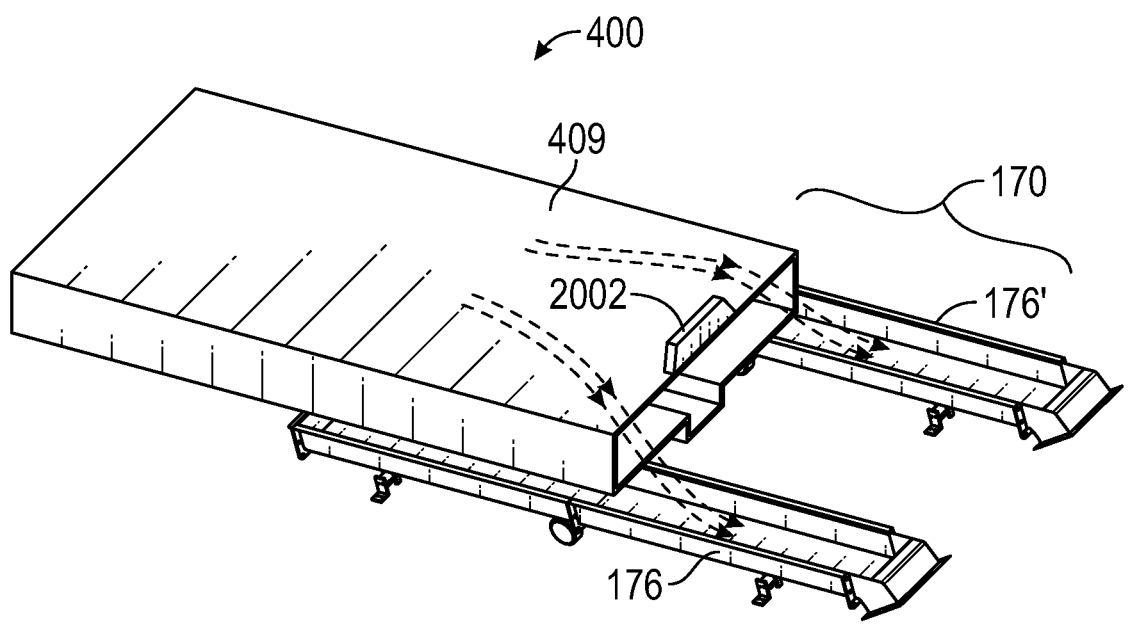
FIG. 20 illustrates a flow of oversized materials in a screening assembly, according to one or more embodiments of the present disclosure.

FIG. 20 illustrates a flow of oversized materials in a screening assembly, according to one or more embodiments of the present disclosure. This example shows an alternative embodiment to that described above with reference to FIG. 19. In this example, the triangular shaped deflector 1902 of FIG. 19 has been replaced, in this embodiment, by a wedge-shaped deflector 2002. In other embodiments, many other configurations of deflectors may be employed, including defectors that are external to screen deck assembly 400.

Figure 21:
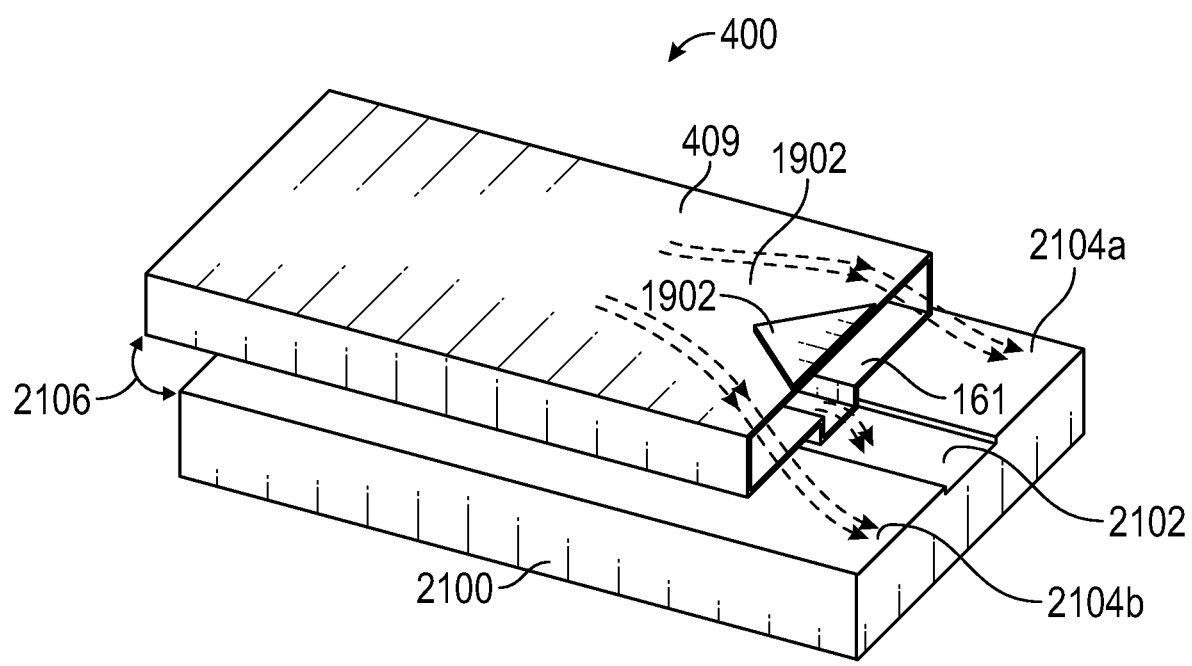
FIG. 21 illustrates a flow of undersized and oversized materials in a screening assembly, according to one or more embodiments of the present disclosure.

FIG. 21 illustrates a flow of undersized and oversized materials in a screening assembly, according to one or more embodiments of the present disclosure. In this example, undersized collecting chute 166 (e.g., see FIG. 17) and oversized collecting troughs 176 and 176' (e.g., see FIGS. 18 to 20) have been replaced by a single structure 2100 that has first 2102, second 2104a, and third 2104a channels. First channel 2102 is configured to collect fluids and undersized materials from collecting pan 161 that flow through the surface of screen 409. Second 2104a and third 2104b channels are configured to collect oversized materials that do not flow through the surface of screen 409. This embodiment is shown having deflector 1902. Other embodiments, however, may include other deflector structures, such as deflector 2002 (e.g., see FIG. 20) or may include an oversized collecting chute 171 (e.g., see FIG. 18). For simplicity, FIG. 21 is shown in a geometry in which screen deck assembly 400 makes a shallow angle 2107 relative to structure 2100. In practice, angle 2106 is larger to thereby accommodate a plurality of screen deck assemblies 400, as shown above in other examples, and in examples illustrated in FIGS. 27 to 29.

Figure 22:
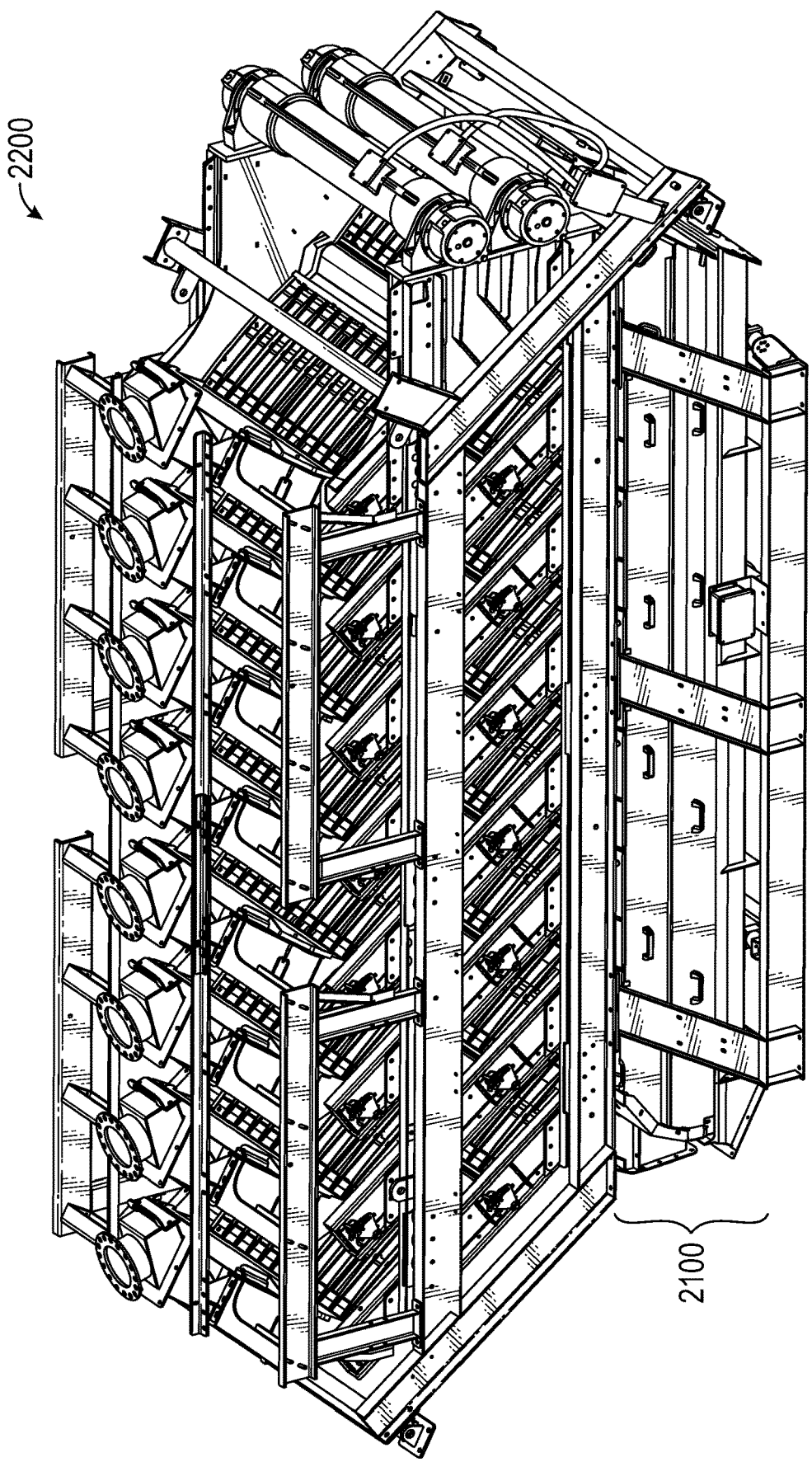
FIG. 22 is a perspective top and side view of a vibratory screening machine, according to one or more embodiments of the present disclosure.

FIG. 22 is a perspective top and side view of a vibratory screening machine 2200, according to one or more embodiments of the present disclosure. Vibratory screening machine 2200 has many of the same features as vibratory screening machine 100, described above with reference to FIGS. 1 to 4. In this embodiment, however, undersized collecting chute 166 and oversized collecting troughs 176 and 176', have been replaced by the single structure 2100. As described above, with reference to FIG. 21, structure 2100 has first 2102, second 2104a, and third 2104a channels as shown in further detail in FIG. 23.

Figure 23:
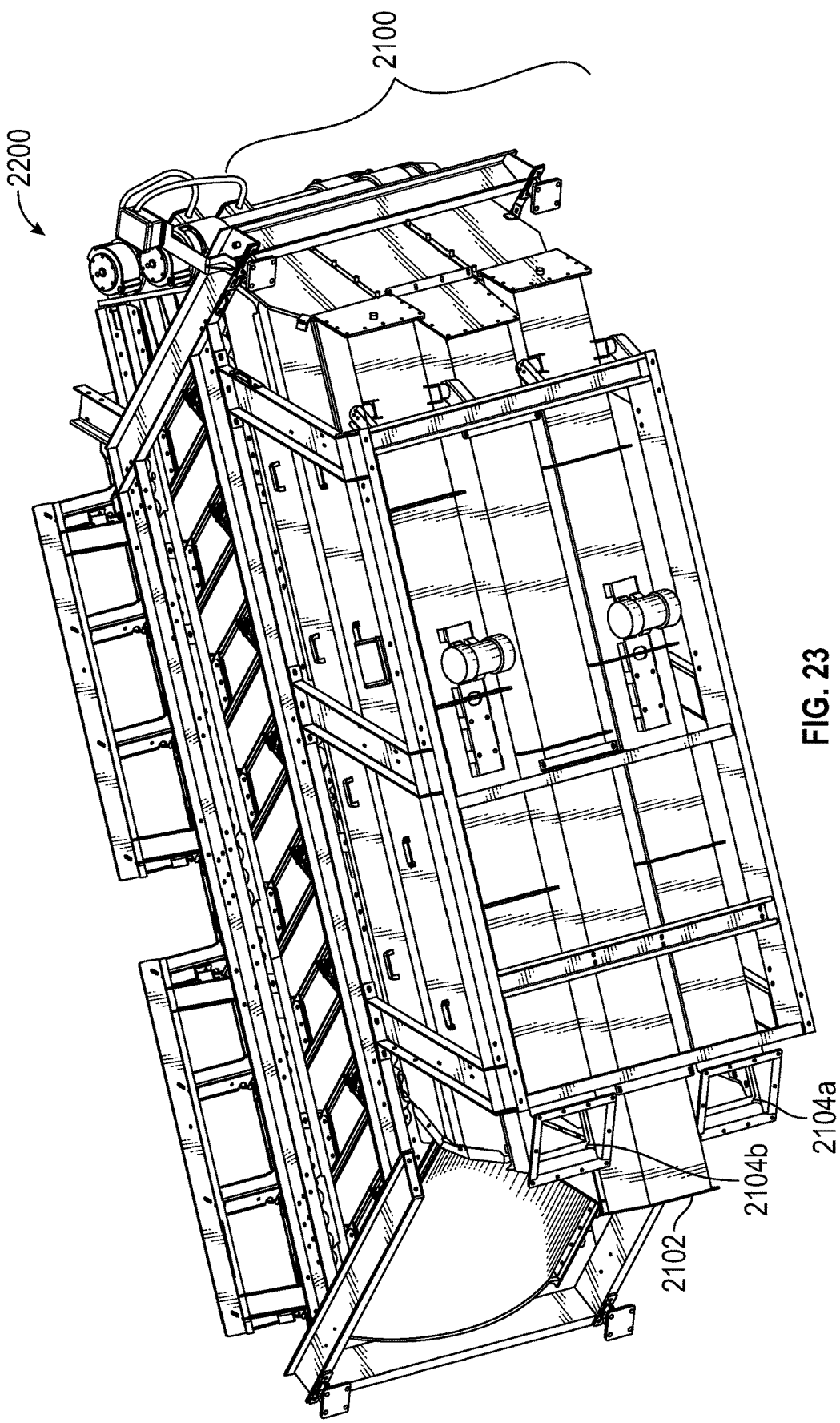
FIG. 23 is a perspective bottom and side view of a vibratory screening machine, according to one or more embodiments of the present disclosure.

FIG. 23 is a perspective bottom and side view of vibratory screening machine 2200, according to one or more embodiments of the present disclosure. As described above, structure 2100 has first 2102, second 2104a, and third 2104a channels. First channel 2102 collects undersized materials, while second 2104a and third 2104a channels collect oversized materials. Undersized and oversized materials may be removed from vibratory screening machine 2200 through first 2102, second 2104a, and third 2104b channels as described above in other embodiments.

Figure 24:
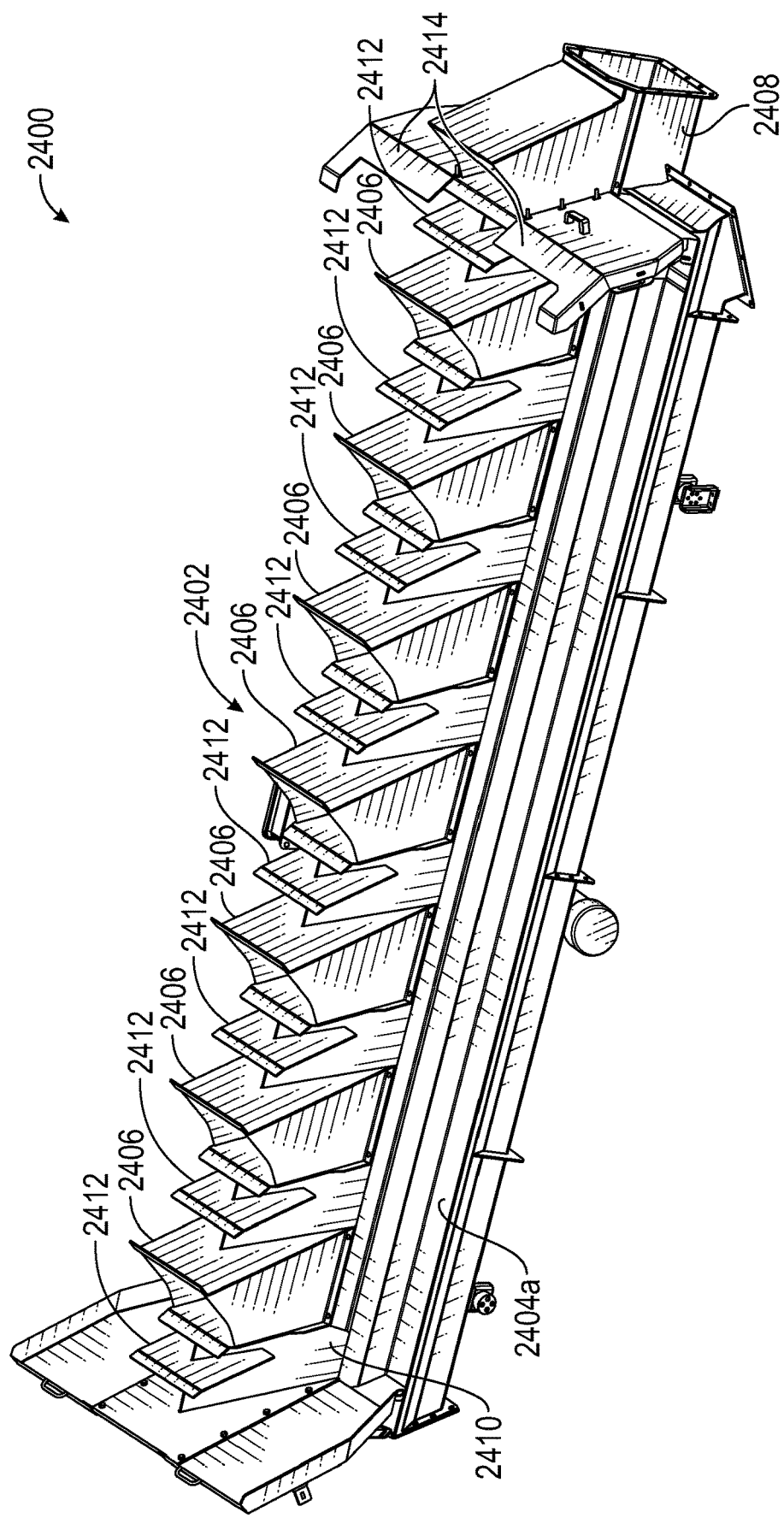
FIG. 24 is a top perspective view of a combined undersized/oversized collecting apparatus that includes an undersized collecting assembly with two oversized collecting troughs, according to one or more embodiments of the present disclosure.

FIG. 24 is a top perspective view of a combined undersized/oversized collecting apparatus 2400 that includes an undersized collecting assembly 2402 with two oversized collecting troughs (only one trough 2404a visible in this view), according to one or more embodiments of the present disclosure. Undersized collecting assembly 2402 includes a plurality of ducts 2406 in communication with a collecting pan 2408. Undersized collecting assembly 2402 has a similar structure to undersized collecting assembly 160, and performs a similar function to undersized collecting assembly 160, as described above with reference to FIGS. 11A and 11B. Similarly, oversize collecting troughs 2404a and 2404b (e.g., see FIG. 26) each have a similar structure to, and perform a function similar to, oversized collecting troughs 176 and 176' described above with reference to FIGS. 4, 13A, and 13B.

Collecting apparatus 2400 of FIG. 24 collects oversized and undersized materials and functions similarly to systems described above with reference to FIGS. 11A to 13B. Collection apparatus 2400, however, eliminates the need for oversized collecting chutes 171, described above with reference to FIGS. 12A and 12B. In this regard, undersized collecting assembly 2402 further includes an angled surface 2410 (described in greater detail below with reference to FIG. 26) that diverts oversize materials flowing over end plate 428 of screening deck assembly 400 (e.g., see FIG. 5) into oversize collecting trough 2404a (and oversize collecting trough 2404b shown in FIG. 26). In this regard, angled surface 2410 plays a role that is similar to the role played by oversized collecting chutes 171 in previously-described embodiments. Further, the presence of angled surface 2410 eliminates the need for deflectors 1902, described above with reference to FIGS. 19 and 21, and deflector 2002, described above with reference to FIG. 20. Collecting apparatus 2400 further includes a plurality of diverting structures 2412 that act to guide oversized materials toward oversized collecting troughs 2404a and 2404b (e.g., see FIG. 26) and away from ducts 2406. Collecting apparatus 2400 may further include splash guards 2414.

Figure 25:
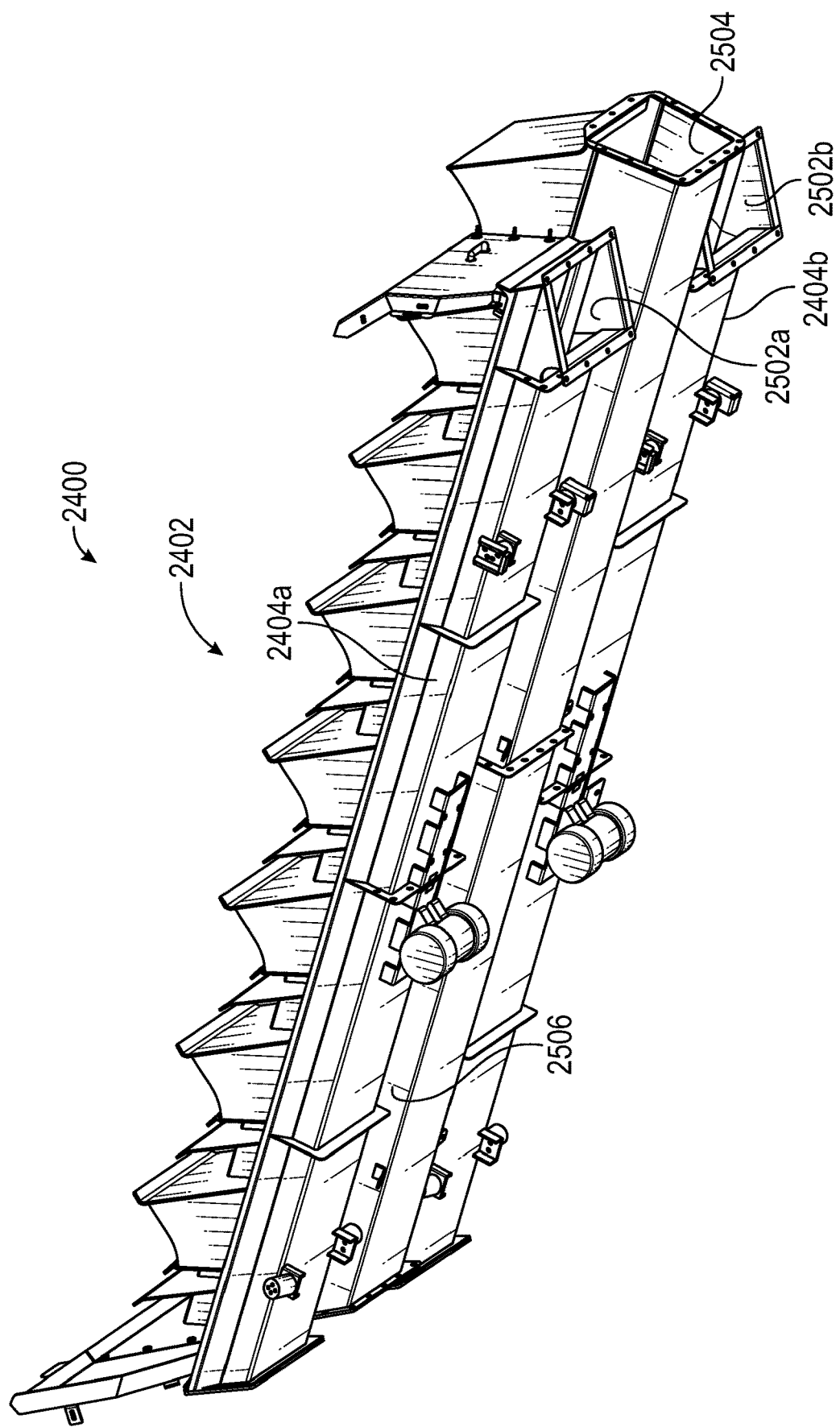
FIG. 25 is a bottom perspective view of the collecting apparatus of FIG. 24, according to one or more embodiments of the present disclosure.

FIG. 25 is a bottom perspective view of collecting apparatus 2400 of FIG. 24, according to one or more embodiments of the present disclosure. In this view, both oversized troughs 2404a and 2404b may be seen. Further, oversized trough 2404a has an outlet 2502a and oversized trough 2404b has an outlet 2502b. Outlets 2502a and 2502b are similar to, and serve a similar function as, outlet 180 of oversized collection trough 176, described above with reference to FIGS. 13A and 13B. Undersized collecting assembly 2402 further includes discharge port 2504 that has a similar structure to, and serves a similar function as, discharge port 169 of undersized collecting assembly 160, described above with reference to FIGS. 11A and 11B. FIG. 25 also shows a view of collecting chute 2506 of undersized collecting assembly 2402, which is similar to, and serves a similar function as, collecting chute 166, described above with reference to FIGS. 11A and 11B.

Figure 26:
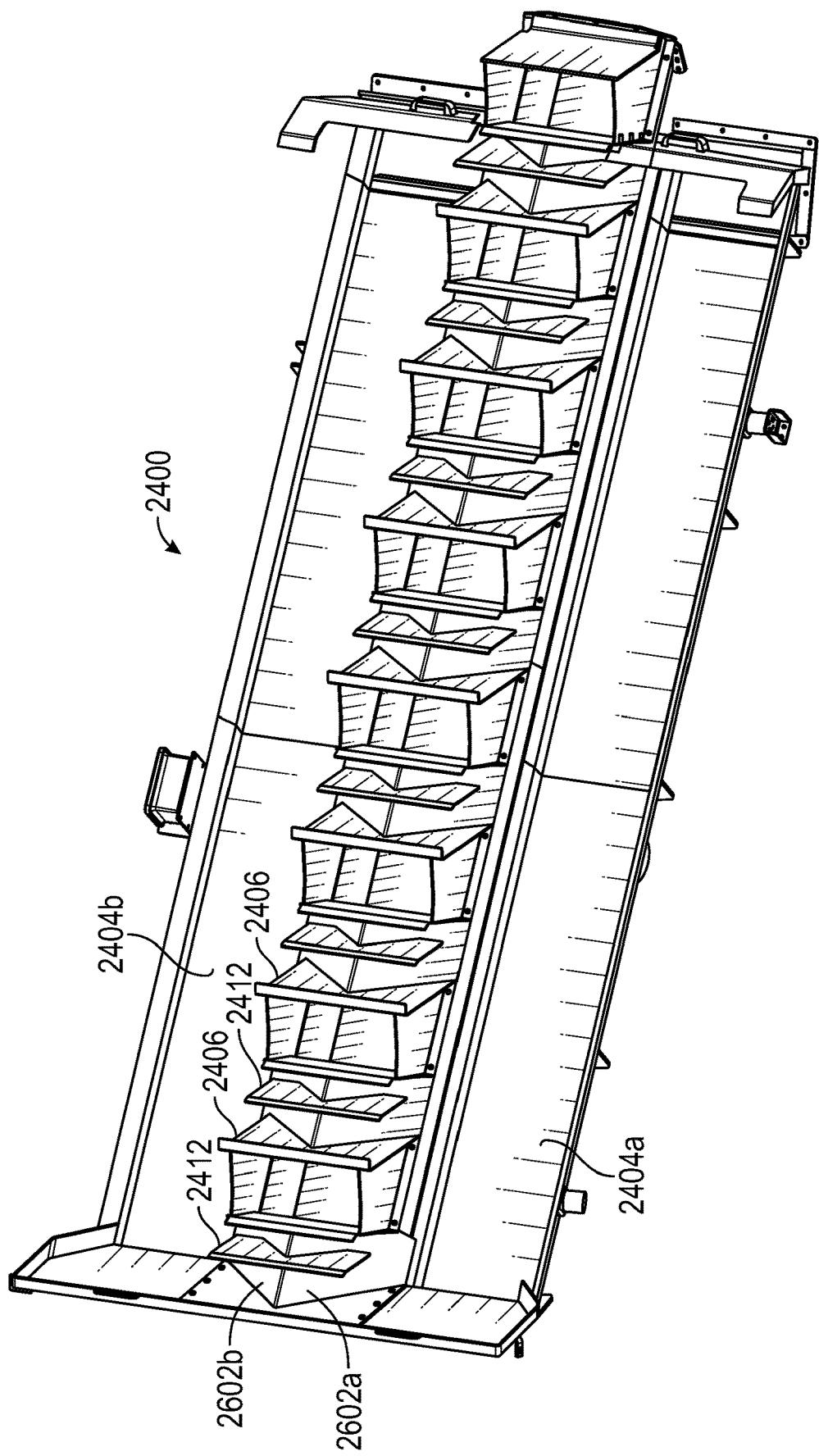
FIG. 26 is a further top perspective view of the collecting apparatus of FIGS. 24 and 25, according to one or more embodiments of the present disclosure.

FIG. 26 is a further top perspective view of collecting apparatus 2400 of FIGS. 24 and 25, according to one or more embodiments of the present disclosure. In this view, both oversized collecting troughs 2404a and 2404b are shown. Further, angled surface 2410 of FIG. 24 is shown in FIG. 26 as having a first angled portion 2602a and a second angled portion 2602b. First angled portion 2602a is sloped downwardly toward oversized collecting trough 2404a and second angled portion 2602b is sloped downwardly toward oversized collecting trough 2404b.

As described in greater detail below with reference to FIGS. 27 to 29, oversize materials flowing over end plate 428 of screening deck assembly 400 (e.g., see FIG. 5) may fall on first angled portion 2602a or on second angled portion 2602b. In this way, oversized materials that land on first angled portion 2602a are diverted to oversized collecting trough 2404a while oversized materials that land on second angled portion 2602b are diverted to oversized collecting trough 2404b. Thus, angled portions 2602a and 2602b respectively play a similar role to chambers 174 and 174' of oversized collecting chutes 171, described above with reference to FIG. 12B. As described above with reference to FIG. 24, collecting apparatus 2400 further includes diverting structures 2412 that act to guide oversized materials toward oversized collecting troughs 2404a and 2404b and away from ducts 2406.

Figure 27:
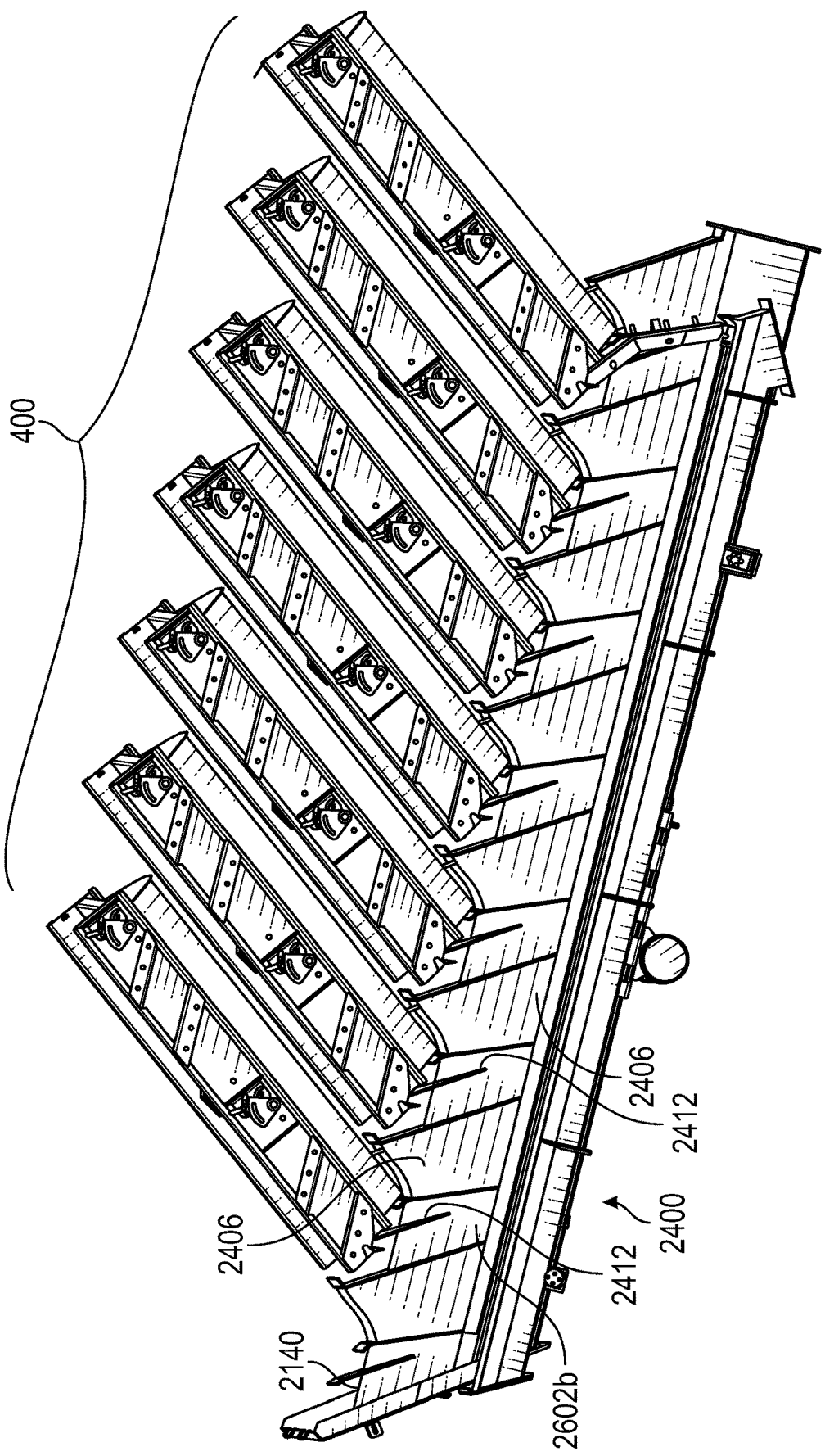
FIG. 27 is a side perspective view of the collecting the apparatus of FIGS. 24, 25, and 26 with a plurality of installed screening deck assemblies, according to one or more embodiments of the present disclosure.

FIG. 27 is a side perspective view of the collecting the apparatus 2400 of FIGS. 24, 25, and 26 with a plurality of installed screening deck assemblies 400, according to one or more embodiments of the present disclosure. In this configuration, oversized material flowing from a top screening surface of screening deck assemblies (e.g., see FIG. 5) is directed by first 2602a and second 2602b (e.g. see FIG. 26) angled portions of angled surface 2410 (e.g., see FIG. 24). Diverting structures 2412 further act to guide oversized materials toward oversized collecting troughs 2404a and 2404b and away from ducts 2406, as described above with reference to FIGS. 24 and 26.

Figure 28:
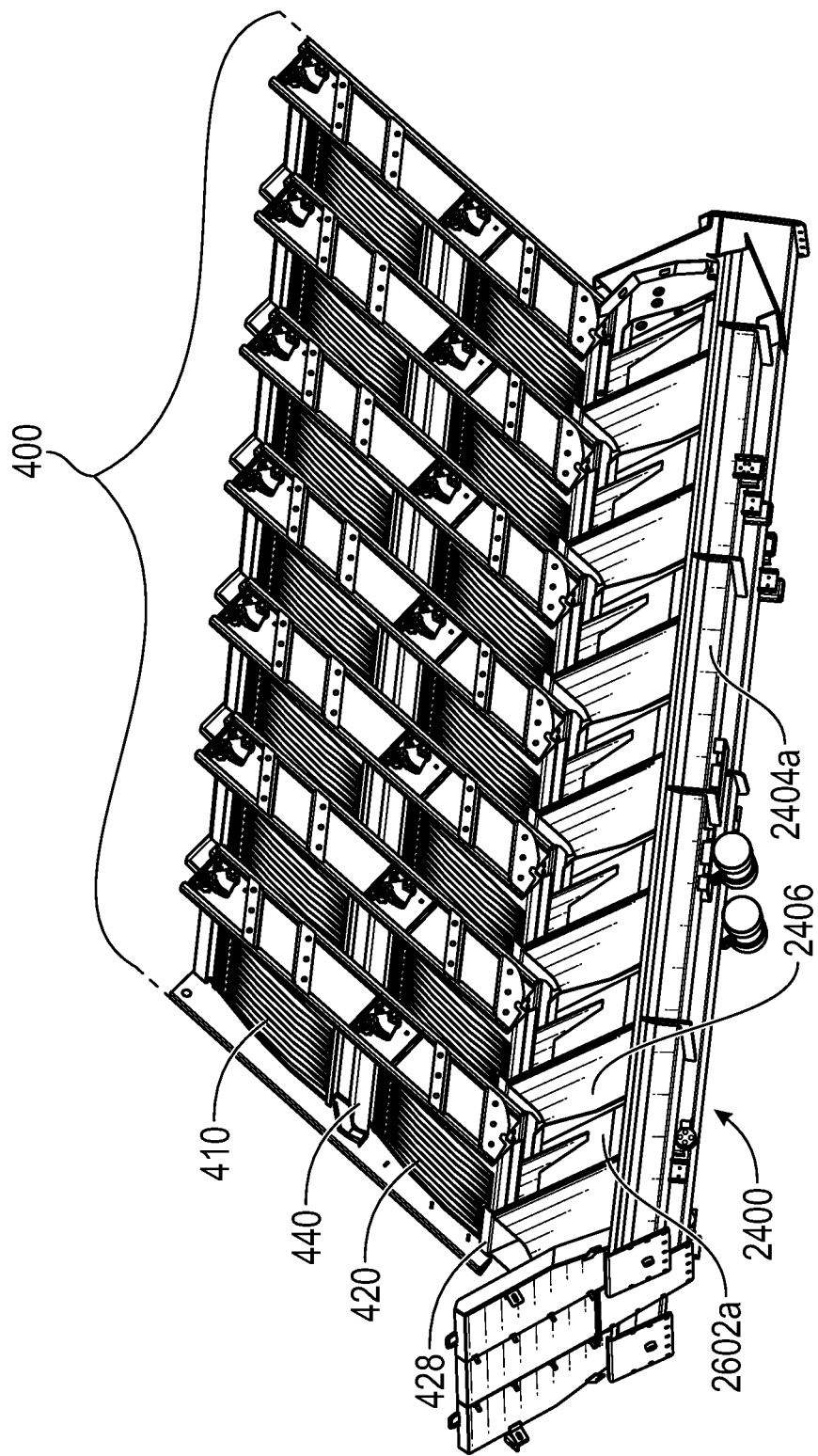
FIG. 28 is a further side perspective view of the collecting apparatus with installed screening deck assemblies of FIG. 27, according to one or more embodiments of the present disclosure.

FIG. 28 is a further side perspective view of collecting apparatus 2400 with installed screening deck assemblies 400 of FIG. 27, according to one or more embodiments of the present disclosure. Each screening deck assembly 400 includes a first screening deck 410, a second screening deck 420, and a wash tray 440, as described above with reference to FIGS. 5 to 10. When in operation, material to be screened is deposited on first screening deck 410 by feed outlet ducts 133 (e.g., see FIG. 2 and related description above). Vibration causes material to flow over first screening deck 410, over wash tray 440, and onto second screening deck 420, as described above with reference to FIGS. 5 to 10.

Undersized material flows through screens 409 and 419 (e.g., see FIGS. 5, 15, 16A, and 16B and related description above) and is collected by ducts 2406 of undersized collecting assembly 2402 (e.g., see FIG. 24). Oversized materials remain on a screening surface of screening decks 410 and 420 and are discharged over lower end plate 428 of screening deck 420 by vibration, as described in greater detail above with reference to FIG. 5. After leaving lower end plate 428, oversized materials then hit one of the first 2602a or second angled portion 2602b (e.g., see FIG. 26) and are thereby directed to respective oversize collecting troughs 2404a or 2404b (e.g., see in FIG. 26) as described above.

Figure 29:
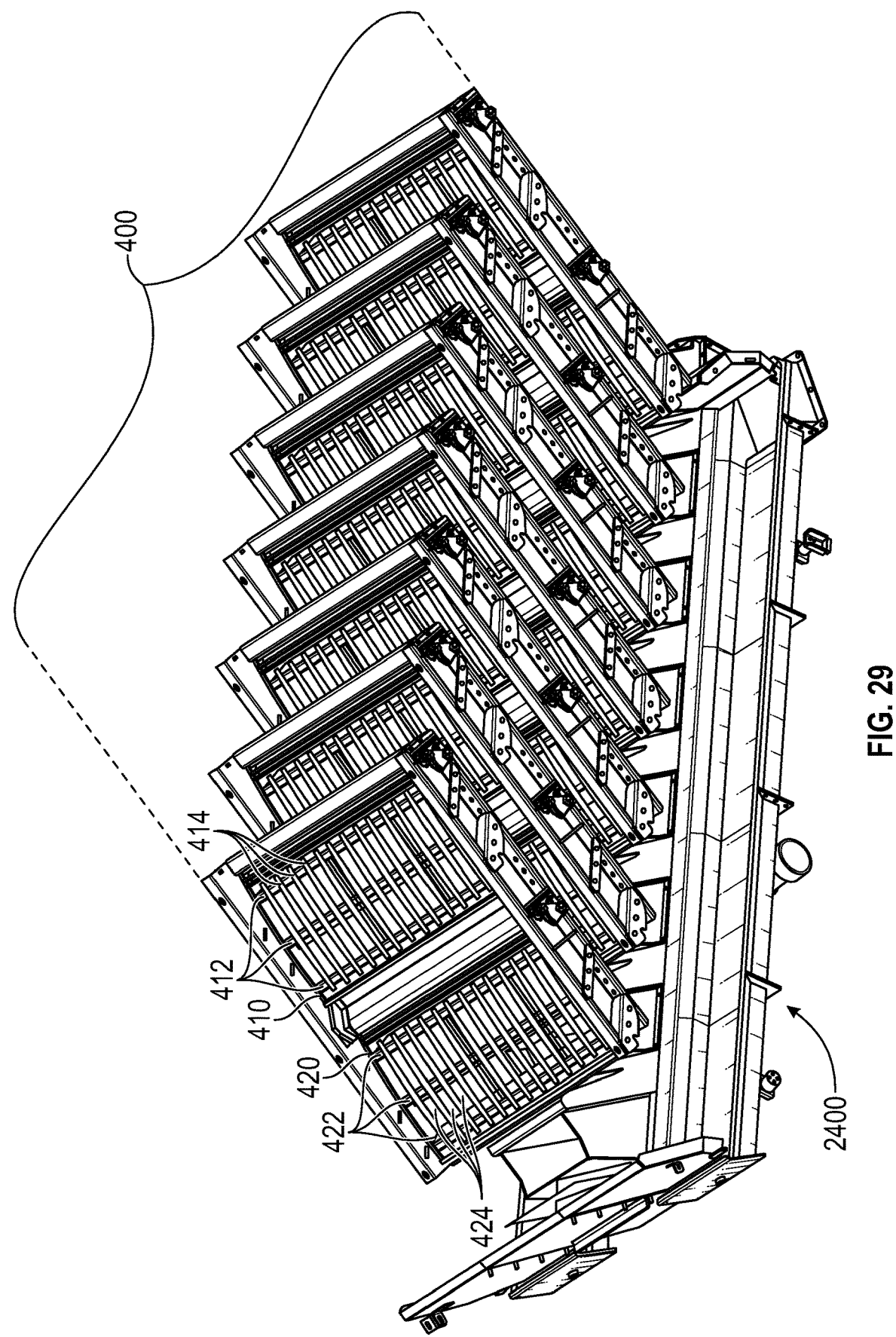
FIG. 29 is a further side perspective view of the collecting apparatus with installed screening deck assemblies of FIGS. 27 and 28, according to one or more embodiments of the present disclosure.

FIG. 29 is a further side perspective view of the collecting apparatus with installed screening deck assemblies of FIGS. 27 and 28, according to one or more embodiments of the present disclosure. This view shows further structural details of screening decks 410 and 420 and should be compared with FIG. 6, described in greater detail above. In this regard, upper screening deck 410 includes a first plurality of stringers 414 and lower screening deck 420 includes a second plurality of stringers 424. First plurality of stringers 412 is supported by ribs 412 and the second plurality of stringers 424 are supported by ribs 422. First 414 and second 424 pluralities of stringers provide mechanical support for screens 409 and 419 (e.g., see FIGS. 5 and 15 and related description above). Screens 409 and 419 (e.g., see FIGS. 5, 14, and 15) may be respectively installed on screen decks 410 and 420 and held in place by a tensioning mechanism (e.g., tensioning strip 455 of FIG. 14) that exerts tension to screens 409 and 419 along a front-to-back direction, that is, in the same direction that material to be screened flows across the screen deck assembly 400.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

This specification and annexed drawings disclose vibratory screening machines that include stacked screening deck assemblies. It is, of course, not possible to describe every conceivable combination of elements for purposes of describing the various aspects of the disclosure. Thus, while embodiments of this disclosure are described with reference to various implementations and exploitations, it is noted that such embodiments are illustrative and that the scope of the disclosure is not limited to them. Those of ordinary skill in the art can recognize that many further combinations and permutations of the disclosed features are possible. As such, various modifications can be made to the disclosure without departing from the scope or spirit thereof. In addition or in the alternative, other embodiments of the disclosure can be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A vibratory screening machine, comprising:
an outer frame;
an inner frame connected to the outer frame;
a vibratory motor assembly attached to the inner fame such that the vibratory motor assembly vibrates the inner frame;
a plurality of screen deck assemblies attached to the inner frame and configured in a stacked arrangement, each one of the plurality of screen deck assemblies configured to receive replaceable screen assemblies, the screen assemblies secured to the screen deck assemblies by tensioning the screen assemblies in a direction that a material to be screened flows across the screen assemblies;
an undersized material discharge assembly configured to receive materials that pass through the screen assemblies; and
an oversized material discharge assembly configured to receive materials that pass over a top surface of the screen assemblies,
wherein the undersized material discharge assembly includes an undersized channel assembly in communication with each one of the plurality of screen deck assemblies, and wherein the oversized material discharge assembly includes an oversized channel assembly in communication with each one of the plurality of screen deck assemblies, and
wherein the oversized material discharge assembly includes a deflector that is configured to receive materials that do not pass through the screen assemblies and that pass over a discharge end of the plurality of screen deck assemblies, the deflector feeding the oversized channel assembly.

2. The vibratory screening machine according to claim 1, wherein the oversized channel assembly includes a first oversized channel assembly and a second oversized channel assembly.

3. The vibratory screening machine according to claim 2, wherein the undersized channel, the first oversized channel assembly, and the second oversized channel assembly are located beneath the plurality of screen deck assemblies, and wherein the undersized channel assembly is located between the first oversized channel assembly and the second oversized channel assembly.

4. The vibratory screening machine according to claim 1, wherein at least one of the plurality of screen deck assemblies is replaceable.

5. The vibratory screening machine according to claim 1, wherein each one of the plurality of screen deck assemblies includes a first screen assembly and a second screen assembly.

6. The vibratory screening machine according to claim 5, further comprising a wash tray located between the first screen assembly and the second screen assembly.

7. The vibratory screening machine according to claim 5, further comprising a trough located between the first screen assembly and the second screen assembly.

8. The vibratory screening machine according to claim 7, wherein the trough includes an Ogee-weir structure.

9. The vibratory screening machine according to claim 1, further comprising a screen tensioning system that includes tensioning rods that extend substantially orthogonal to the direction of flow of the material being screened, wherein the tensioning rods are configured to mate with a portion of the screen assembly and tension the screen assembly when rotated.

10. The vibratory screening machine according to claim 9, wherein the screen tensioning system includes a ratcheting assembly configured to rotate the tensioning rod such that the tensioning rod moves between a first open screen assembly receiving position to a second closed and secured screen assembly tensioned position.

11. The vibratory screening machine according to claim 1, further comprising a vibratory motor, wherein the vibratory motor is attached to the oversized channel assembly.

12. The vibratory screening machine according to claim 1, further comprising multiple feed assembly units, each one of the multiple feed assembly units located substantially directly below individual discharges of a flow divider.

13. The vibratory screening machine according to claim 1, wherein the vibratory screening machine includes at least eight screen deck assemblies.

14. The vibratory screening machine according to claim 2, wherein the undersized material discharge assembly and the oversized material discharge assembly are configured as a single structure.

15. A method of screening a material, comprising:
feeding the material on a vibratory screening machine having a plurality of screen deck assemblies that are configured in a stacked arrangement, each one of the plurality of screen deck assemblies configured to receive replaceable screen assemblies, the replaceable screen assemblies secured to the plurality of screen deck assemblies by tensioning the replaceable screen assemblies in the direction the material flows across the replaceable screen assemblies; and
screening the materials such that an undersized material that passes through the replaceable screen assemblies flows into an undersized material discharge assembly and an oversized material flows over an end of the plurality of screen deck assemblies into an oversized material discharge assembly, wherein the undersized material discharge assembly includes an undersized channel assembly in communication with each one of the plurality of screen deck assemblies and the oversized material discharge assembly includes an oversized channel assembly in communication with each one of the plurality of screen deck assemblies, and
wherein the oversized material discharge assembly includes a deflector that is configured to receive materials that do not pass through the screen assemblies and that pass over a discharge end of the plurality of screen deck assemblies, the deflector feeding the oversized channel assembly.

16. The method of screening materials according to claim 15, wherein the oversized channel assembly includes a first oversized channel assembly and a second oversized channel assembly.

17. The method of screening a material according to claim 16, wherein the undersized channel assembly, the first oversized channel assembly, and the second oversized channel assembly are located beneath the plurality of screen deck assemblies, and wherein the undersized channel assembly is located between the first oversized channel assembly and the second oversized channel assembly.

18. The method of screening a material according to claim 15, wherein at least one of the plurality of screen deck assemblies is replaceable.

19. The method of screening a material according to claim 15, wherein each one of the plurality of screen deck assemblies includes a first screen assembly and a second screen assembly.

20. The method of screening a material according to claim 19, further comprising a trough located between the first screen assembly and the second screen assembly.

21. The method of screening a material according to claim 20, wherein the trough includes an Ogee-weir structure.

22. The method of screening a material according to claim 15, further comprising a screen tensioning system that includes tensioning rods that extend substantially orthogonal to the direction of flow of the material being screened, wherein the tensioning rods are configured to mate with a portion of the screen assembly and tension the screen assembly when rotated.

23. A vibratory screening machine for screening particles of a material to be screened, comprising:
an outer frame;
an inner frame connected to the outer frame;
a vibratory motor assembly secured to the inner frame such that the vibratory motor vibrates the inner frame;
a plurality of screen deck assemblies attached to the inner frame and configured in a generally stacked arrangement, each one of the plurality of screen deck assemblies having a front-to-back dimension extending from a material input end to a material output end;
a plurality of replaceable screens removably secured to respective ones of the plurality of screen deck assemblies, a first replaceable screen of the plurality of replaceable screens secured to a first screen deck assembly of the plurality of screen deck assemblies by tensioning the first replaceable screen substantially along the front-to back dimension;
an undersized material discharge assembly configured to receive particles of said material that pass through the first replaceable screen; and
an oversized material discharge assembly configured to receive particles of said material that pass over a top surface of the first replaceable screen,
wherein the undersized material discharge assembly includes an undersized channel assembly in communication with each one of the screen deck assemblies, and wherein the oversized material discharge assembly includes an oversized channel assembly in communication with each one of the screen deck assemblies, and
wherein the oversized material discharge assembly includes a deflector that is configured to receive materials that do not pass through the screen assemblies and that pass over a discharge end of the plurality of screen deck assemblies, the deflector feeding the first and second oversized channel assemblies.

24. The vibratory screening machine according to claim 23, wherein each one of the plurality of screen deck assemblies includes a first screen deck and a second screen deck, the first screen deck having a first replaceable screen secured thereto, and the second screen deck having a second replaceable screen secured thereto.

25. The vibratory screening machine according to claim 24, further comprising a wash tray located between the first screen deck and the second screen deck.

26. The vibratory screening machine according to claim 24, further comprising a trough located between the first screen deck and the second screen deck.

27. The vibratory screening machine according to claim 26, wherein the trough includes an Ogee-weir structure.

28. The vibratory screening machine according to claim 23, further comprising a screen tensioning system that includes tensioning rods that extend substantially orthogonal to the front-to-back dimension, wherein the tensioning rods are configured to mate with a portion of the screen and tension the screen when rotated.

29. The vibratory screening machine according to claim 28, wherein the screen tensioning system includes a ratcheting assembly configured to rotate a first tensioning rod of the tensioning rods such that the first tensioning rod moves between a first open screen assembly receiving position to a second closed and secured screen assembly tensioned position.

30. The vibratory screening machine according to claim 23, wherein the undersized material discharge assembly and the oversized material discharge assembly are configured as a single structure.

* * * * *